US012632281B2

(12) United States Patent
    Uchikoshi et al.

(10) Patent No.: US 12,632,281 B2
(45) Date of Patent: May 19, 2026

(54) INFORMATION PROCESSING APPARATUS, INFORMATION PROCESSING SYSTEM, AND INFORMATION PROCESSING METHOD

(71) Applicant: Panasonic Intellectual Property Management Co., Ltd., Osaka (JP)

(72) Inventors: Tadahiro Uchikoshi, Kanagawa (JP); Hiroshi Ando, Kanagawa (JP); Hiroshi Ikeda, Tokyo (JP); Shintaro Tsubata, Kanagawa (JP); Masahito Oishi, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 468 days.

(21) Appl. No.: 18/209,172

(22) Filed: Jun. 13, 2023

(65) Prior Publication Data

US 2023/0325231 A1     Oct. 12, 2023

Related U.S. Application Data

(63) Continuation of application No. PCT/JP2021/036854, filed on Oct. 5, 2021.

(30) Foreign Application Priority Data

Dec. 16, 2020     (JP) ................................. 2020-208427

(51) Int. Cl.
    *G06F 9/44*        (2018.01)
    *B60K 35/10*       (2024.01)
    (Continued)

(52) U.S. Cl.
    CPC .......... *G06F 9/45558* (2013.01); *B60K 35/10* (2024.01); *B60K 35/215* (2024.01);
    (Continued)

(58) Field of Classification Search
    CPC .................................................... G06F 9/45558
    (Continued)

(56) References Cited

U.S. PATENT DOCUMENTS

| | | | | |
|---|---|---|---|---|
| 6,859,144 B2 * | 2/2005 | Newman | ................ | B60Q 9/008 |
| | | | | 382/104 |
| 2015/0242233 A1 * | 8/2015 | Brewerton | .............. | G06F 13/28 |
| | | | | 710/308 |

(Continued)

FOREIGN PATENT DOCUMENTS

| | | |
|---|---|---|
| JP | 2007-249567 | 9/2007 |
| WO | 2020/235361 | 11/2020 |

OTHER PUBLICATIONS

English language translation of Office Action from Japan Patent Office (JPO) in Japanese Patent Appl. No. 2020-208427, dated Sep. 3, 2024.

(Continued)

*Primary Examiner* — Timothy A Mudrick

(74) *Attorney, Agent, or Firm* — Greenblum & Bernstein, P.L.C.

(57)            ABSTRACT

An information processing apparatus is provided. This information processing apparatus includes a first OS that controls execution of a first application, a second OS that controls execution of a second application, and a hypervisor that is executed on a processor and controls execution of the first OS and the second OS.

19 Claims, 16 Drawing Sheets

(51) Int. Cl.

| | |
|---|---|
| *B60K 35/215* | (2024.01) |
| *B60K 35/22* | (2024.01) |
| *B60K 35/28* | (2024.01) |
| *B60K 35/29* | (2024.01) |
| *B60K 35/60* | (2024.01) |
| *B60K 35/81* | (2024.01) |
| *G06F 3/01* | (2006.01) |
| *G06F 9/455* | (2018.01) |
| *G08G 1/16* | (2006.01) |
| *B60K 35/23* | (2024.01) |

(52) U.S. Cl.
    CPC ............ *B60K 35/22* (2024.01); *B60K 35/285*
        (2024.01); *B60K 35/29* (2024.01); *B60K 35/60*
        (2024.01); *B60K 35/81* (2024.01); *G06F 3/013*
        (2013.01); *G08G 1/16* (2013.01); *B60K 35/23*
        (2024.01); *B60K 35/28* (2024.01); *B60K*
        *2360/178* (2024.01); *G06F 2009/45591*
                                    (2013.01)

(58) Field of Classification Search
    USPC ............................................................ 718/1
    See application file for complete search history.

(56)                    References Cited

U.S. PATENT DOCUMENTS

2017/0305342 A1* 10/2017 Tomioka ............... G06F 3/1423
2022/0073019 A1*  3/2022 Sakai .................. B60R 16/0232

OTHER PUBLICATIONS

International Search Report (ISR) from International Searching
Authority (Japan Patent Office) in International Pat. Appl. No.
PCT/JP2021/036854, dated Nov. 22, 2021, together with an English
language translation.

* cited by examiner

INFORMATION PROCESSING APPARATUS, INFORMATION PROCESSING SYSTEM, AND INFORMATION PROCESSING METHOD

TECHNICAL FIELD

The present disclosure relates to an information processing apparatus, an information processing system, and an information processing method.

BACKGROUND ART

Patent Literature (hereinafter, referred to as "PTL") 1 discloses a technique of selecting, from among a plurality of display apparatuses mounted in a vehicle, a display apparatus to which a driver's line of sight is directed, and displaying, on a screen of the selected display apparatus, information necessary for driving.

The display control apparatus disclosed in PTL 1 includes a line-of-sight detector that, based on a face image of the driver captured by an imager, detects a direction in which the driver's line of sight is directed, and a selector that selects, as a display apparatus on which the information necessary for driving is to be displayed, one of a plurality of display apparatuses to which the driver directs the line of sight, based on line-of-sight information indicating the direction in which the line of sight is directed.

According to the above-described display control apparatus, the information necessary for driving is displayed on the display apparatus to which the driver directs the line of sight. It is thus possible to confirm the information necessary for driving while grasping a situation around the vehicle in the directed line of sight.

CITATION LIST

Patent Literature

PTL 1
  Japanese Patent Application Laid-Open No. 2007-249567

SUMMARY OF INVENTION

Technical Problem

However, in the prior art disclosed in PTL 1, when a first application for controlling a speedometer or the like having a high safety requirement level and a second application for controlling an apparatus such as a navigation apparatus or a line-of-sight detector having a lower safety requirement level than the display apparatus operate on the same Operating System (OS), there is a risk that a failure of the second application causes a failure in the OS, which makes the operation of the first application unstable.

One non-limiting and exemplary embodiment of the present disclosure facilitates providing an information processing apparatus, an information processing system, and an information processing method capable of improving the stability of operation of a plurality of applications.

Solution to Problem

An information processing apparatus according to one exemplary embodiment of the present disclosure includes: a first OS that controls execution of a first application governing an operation of a first apparatus mounted in a vehicle;

a second OS that controls execution of a second application governing an operation of a second apparatus that is mounted in the vehicle and that has a safety requirement level higher than a safety requirement level of the first apparatus; and a hypervisor that is executed on a processor and controls execution of the first OS and the second OS.

An information processing system according to one exemplary embodiment of the present disclosure includes: the above-described information processing apparatus; the first apparatus; and the second apparatus.

An information processing method according to one exemplary embodiment of the present disclosure includes: controlling, by a first OS, execution of a first application governing an operation of a first apparatus mounted in a vehicle; controlling, by a second OS, execution of a second application governing an operation of a second apparatus that is mounted in the vehicle and has a safety requirement level higher than a safety requirement level of the first apparatus; and controlling, by a hypervisor executed on a processor, execution of the first OS and the second OS.

Advantageous Effects of Invention

According to one exemplary embodiment of the present disclosure, it is possible to build an information processing apparatus, an information processing system, and an information processing method capable of improving the stability of the operation of a plurality of applications.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, preferred embodiments of the present disclosure will be described in detail with reference to the appended drawings. Note that, in the present specification and drawings, components having substantially the same functions are provided with the same reference symbols, and redundant description will be omitted.

(Embodiment)

To begin with, the background that led to creation of embodiments according to the present disclosure will be described.

For example, in the known technique described in PTL 1, when a first application for controlling a speedometer or the like having a high safety requirement level and a second application for controlling an apparatus such as a navigation apparatus or a line-of-sight detector having a lower safety requirement level than the display apparatus operate on the same Operating System (OS), there is a risk that a failure of the second application causes a failure in the OS, which makes the operation of the first application unstable.

For example, when a failure occurs in an application for controlling a line-of-sight detection apparatus having a low safety requirement level, thereby causing the line-of-sight detection apparatus to be uncontrollable, there is a possibility that the failure affects other applications, and thus the control on the speedometer having a high safety requirement level becomes impossible together with the control on the line-of-sight detection apparatus.

Therefore, an improvement in the stability of the operation of a plurality of applications is demanded. Hereinafter, embodiments according to the present disclosure will be described.

Figure 1:
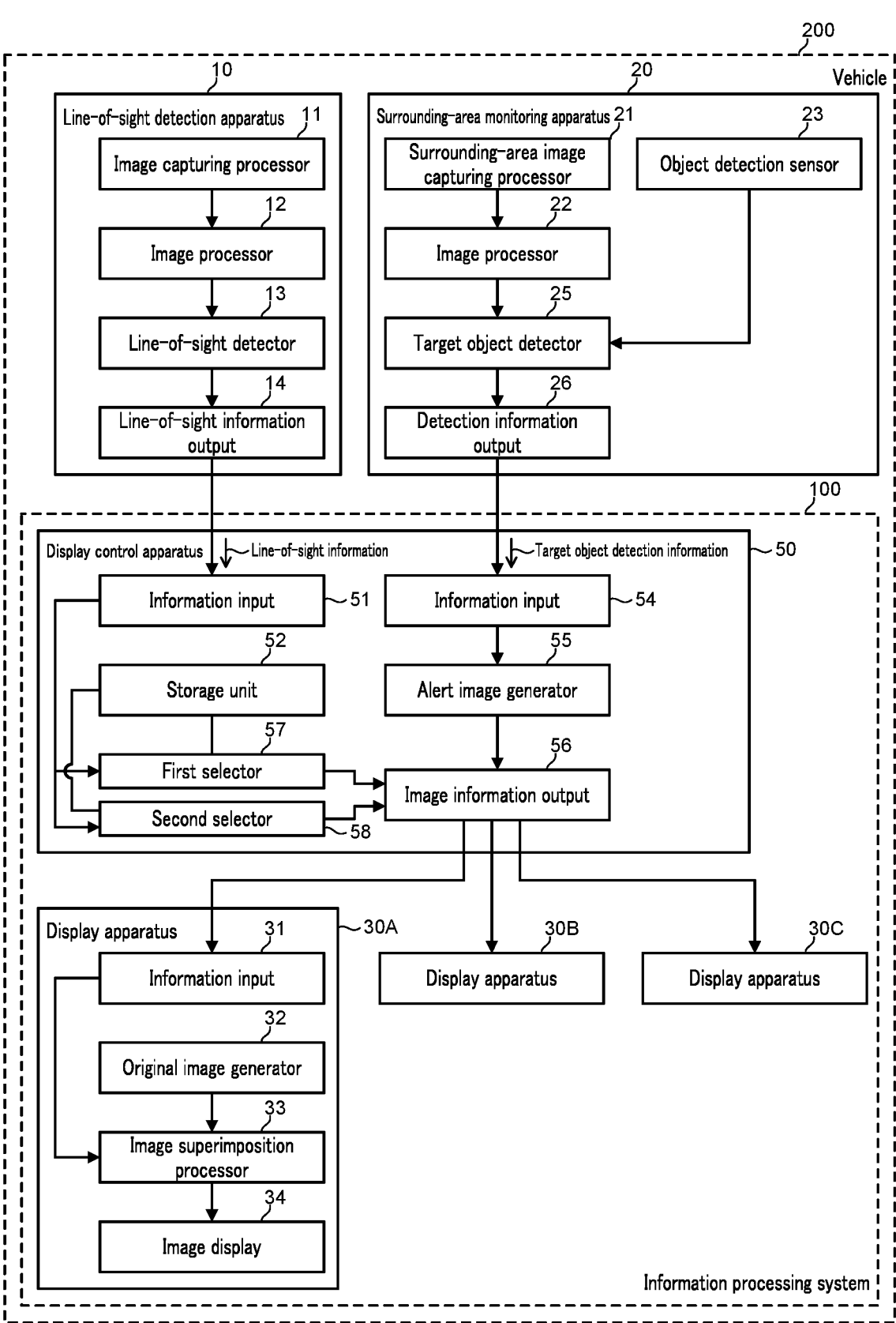
FIG. 1 illustrates a configuration example of information processing system 100 according to an embodiment of the present disclosure.

FIG. 1 illustrates a configuration example of information processing system 100 according to an embodiment of the present disclosure. Vehicle 200 illustrated in FIG. 1 includes information processing system 100, line-of-sight detection apparatus 10 that sequentially detects a line of sight of an occupant of vehicle 200, and surrounding-area monitoring apparatus 20 that monitors an object existing in the surrounding area of the vehicle.

Each of line-of-sight detection apparatus 10 and surrounding-area monitoring apparatus 20 are one examples of the information processing apparatus according to the present disclosure.

The vehicle occupant is a driver, a passenger, or the like of vehicle 200. Vehicle 200 is a passenger car, a freight car, a shared car, or the like. In the embodiment of the present disclosure, a configuration example of information processing system 100 that detects the line of sight of the driver of vehicle 200 will be described.

(Information Processing System 100)

Information processing system 100 includes a plurality of display apparatus 30A to 30C and display control apparatus 50.

Hereinafter, the plurality of display apparatuses 30A to 30C are referred to as "display apparatuses 30" when they are not distinguished from one another.

Display apparatuses 30 and display control apparatus 50 are one examples of the information processing apparatus according to the present disclosure.

(Line-of-Sight Detection Apparatus 10)

Line-of-sight detection apparatus 10 is an apparatus that detects a line-of-sight direction of a driver of vehicle 200 and outputs line-of-sight information indicating a direction in which the line of sight of the driver is directed. Line-of-sight detection apparatus 10 is one example of the first apparatus according to the present disclosure.

Line-of-sight detection apparatus 10 includes image capturing processor 11, image processor 12, line-of-sight detector 13, and line-of-sight information output 14.

(Image Capturing Processor 11)

Image capturing processor 11 is a camera or the like that captures an image of the inside of the vehicle. Image capturing processor 11 includes an imaging element such as a Charge Coupled Device (CCD) or a Complementary Metal Oxide Semiconductor (CMOS).

Image capturing processor 11 is disposed at a position where an image of the driver's face can be captured, captures an image including the driver's face, and sequentially outputs data of the captured image (hereinafter, referred to as image data) to image processor 12.

The position where an image of the driver's face can be captured is, for example, a dashboard of vehicle 200, an instrument panel of the driver's seat, a ceiling of vehicle 200, or the like.

Note that the number of image capturing processors 11 is not limited to one, and a plurality of image capturing processors may be disposed in the vehicle.

(Image Processor 12)

When the image data is inputted, image processor 12 binarizes the image captured by image capturing processor 11 to obtain a binary image. Image processor 12 inputs data of the binary image (hereinafter, referred to as "binary image data") to line-of-sight detector 13.

(Line-of-Sight Detector 13)

Line-of-sight detector 13 detects a line of sight based on the binary image data. For example, line-of-sight detector 13 identifies an eyeball region of the driver by analyzing the binary image data, and obtains the eyeball center coordinates from the curvature of the eyeball shape.

Further, line-of-sight detector 13 identifies an iris (pupil) region from the eyeball region to obtain iris center coordinates, and determines a direction from the above-described eyeball center coordinates toward the iris center coordinates as a line-of-sight direction.

Further, by using an eyeball center position as a starting point, line-of-sight detector 13 identifies, as the line of sight, a straight line extending from the start point in the line-of-sight direction, and transmits line-of-sight information, which is information indicating the identified line of sight, to line-of-sight information output 14.

(Line-of-Sight Information Output 14)

Line-of-sight information output 14 outputs, to information input 51 of display control apparatus 50, the line-of-sight information transmitted from line-of-sight detector 13. Details of the configuration of information input 51 will be described later.

Image processor 12, line-of-sight detector 13, and line-of-sight information output 14 are one examples of the first application according to the present disclosure.

(Surrounding-Area Monitoring Apparatus 20)

Surrounding-area monitoring apparatus 20 is an apparatus for detecting an object existing in the surrounding area of the vehicle. Surrounding-area monitoring apparatus 20 is one example of the first apparatus according to the present disclosure.

Surrounding-area monitoring apparatus 20 includes surrounding-area image capturing processor 21, image processor 22, object detection sensor 23, target object detector 25, and detection information output 26.

(Surrounding-Area Image Capturing Processor 21)

Surrounding-area image capturing processor 21 is an omnidirectional camera, a panoramic camera, or the like that captures an image of the surroundings of the vehicle. Hereinafter, the image of the surroundings of the vehicle is referred to as "surrounding-area image." Like image capturing processor 11 of line-of-sight detection apparatus 10, surrounding-area image capturing processor 21 includes an image sensor such as a CCD or CMOS.

The surrounding-area image is, for example, an image of a landscape in front of vehicle 200, a landscape on a lateral side of vehicle 200, a landscape in the rear of vehicle 200, and the like. Examples of the landscapes include an object existing on a roadway on which vehicle 200 is traveling. Examples of the object existing on the roadway include automobiles, buildings, structures (advertisements, road signs, traffic lights, utility poles, etc.), humans, animals, and the like.

Surrounding-area image capturing processor 21 is disposed, for example, at a position where an image of the landscape outside the vehicle can be captured. The position is at a front grille, a side mirror, a ceiling, a rear bumper, or the like. Surrounding-area image capturing processor 21 inputs data of the captured surrounding-area image (hereinafter, referred to as "surrounding-area image data") to image processor 22.

(Image Processor 22)

Image processor 22 performs image processing for detecting a detection target object from among objects existing in the surrounding area of vehicle 200 based on the surrounding-area image data. Hereinafter, a preset detection target object is referred to as the "target object."

Examples of the target object include a passenger car, a motorcycle, a bus, a taxi, a bicycle, a pedestrian, and an animal. The image processing is, for example, edge detection processing. Image processor 22 inputs an image of the target object to target object detector 25.

(Object Detection Sensor 23)

Object detection sensor 23 is a sensor for detecting a position of an object existing in the surrounding area of the vehicle, and is, for example, a sonar.

The sonar emits, for example, a pulsed sound wave having a constant frequency. When the pulsed sound wave hits an object or the like in the surrounding area of the vehicle, a part of the pulsed sound wave is reflected and returns to the sonar. The longer the distance from the vehicle to the object, the longer the time taken until the part of the pulsed sound wave returns to the sonar after the emission of the pulsed sound wave from the sonar.

Using this relationship, the sonar estimates the distance to the object by measuring the round-trip time taken until an echo reflected by the object returns to the sonar after the emission of the pulsed sound wave, and detects the position of the object with reference to the vehicle based on the estimated distance.

Further, object detection sensor 23 inputs object position information, which is information indicating the position of the detected object, to target object detector 25.

(Target Object Detector 25)

Target object detector 25 performs, for example, the following determination based on the image and the object position information of a target.

(1) Target object detector 25 determines that there is no collision risk, for example, when a rear end of a preceding vehicle, which is a detection target, is present in front of the vehicle and the distance from this rear end to a front end of the vehicle is equal to or greater than a predetermined value (for example, several meters to several tens of meters) that changes in accordance with the relative speed.

(2) Target object detector 25 determines that there is a collision risk, for example, when the rear end of the preceding vehicle, which is a detection target, is present in front of the vehicle and the distance from this rear end to the front end of the vehicle is less than the predetermined value.

In this way, target object detector 25 detects a target object that might collide with the vehicle, generates target object detection information that is information indicating detection of the target object that might collide with the vehicle, and transmits the target object detection information to detection information output 26.

(Detection Information Output 26)

Detection information output 26 outputs the target object detection information transmitted from target object detector 25 to information input 54 of display control apparatus 50. Details of the configuration of information input 54 will be described later.

Image processor 22, target object detector 25, and detection information output 26 are one examples of the first application or the second application according to the present disclosure.

(Display Control Apparatus 50)

Display control apparatus 50 is an apparatus that generates an alert image provided to a vehicle occupant based on the line-of-sight information and the target object detection information, and transmits the generated alert image to display apparatus 30. Display control apparatus 50 is one example of the second apparatus according to the present disclosure.

The alert image is one example of information necessary for driving. The alert image is, for example, an image for alerting the vehicle occupant that a target object that may collide with vehicle 200 exists in the surrounding area of the vehicle. The alert image is produced based on, for example, the target object detection information transmitted from surrounding-area monitoring apparatus 20.

The alert image may be a symbol such as "!" or a character such as "collision danger" that can alert the vehicle occupant. Further, the alert image may be a combination thereof.

Display control apparatus 50 includes information input 51, storage unit 52, first selector 57, information input 54, alert image generator 55, image information output 56, first selector 57, and second selector 58.

Information input 51, first selector 57, information input 54, alert image generator 55, image information output 56, first selector 57, and second selector 58 are one examples of the second application according to the present disclosure.

(Information Input 51)

The line-of-sight information transmitted from line-of-sight information output 14 is inputted to information input 51, and information input 51 transfers the line-of-sight information to first selector 57 and second selector 58.

(Storage Unit 52)

Storage unit 52 stores, for example, coordinate data, an identification ID (Identifier) of display apparatus 30, a line-of-sight detection history, an information display history, and the like. Details of these pieces of information will be described later.

(First Selector 57)

For example, when the line-of-sight information is outputted from line-of-sight information output 14 at a predetermined cycle, first selector 57 determines that line-of-sight detection apparatus 10 normally detects the line of sight of the driver.

In this case, first selector 57 selects, as the display apparatus that displays the alert image, one of a plurality of display apparatuses 30 which exists in the direction toward which the line of sight is directed.

Specifically, first selector 57 reads the coordinate data stored in storage unit 52, and identifies display apparatus 30 existing in the line of sight of the driver with reference to the front side of an in-vehicle meter panel as a reference position. The coordinate data is data representing a position of each of the display surfaces of the plurality of display apparatuses in the vehicle.

First selector 57 selects identified display apparatus 30 as a display apparatus for displaying the alert image.

First selector 57 reads the identification ID corresponding to selected display apparatus 30 from, for example, storage unit 52, and transmits it to image information output 56. Details of the configuration of image information output 56 will be described later.

(Second Selector 58)

For example, when the line-of-sight information is not outputted from line-of-sight information output 14 at a predetermined cycle, second selector 58 determines that line-of-sight detection apparatus 10 is incapable of normally detecting the line of sight of the driver.

The state in which the line of sight cannot be normally detected is, for example, a state in which the line of sight of the driver cannot be detected due to fogging of the lens of image capturing processor 11, a state in which the line of sight of the driver cannot be detected due to a bug occurring in software for controlling line-of-sight detection apparatus 10, a state in which the line of sight is blocked by eyeglasses or the like, or so forth.

As described above, in a case where the line-of-sight information is not outputted from line-of-sight information output 14, the alert image, which is the information necessary for driving, cannot be displayed on display apparatus 30 toward which the line of sight of the driver is directed, and there is a possibility of a decrease in the safety of driving.

As a countermeasure against this problem, display control apparatus 50 according to the embodiment of the present disclosure is configured to estimate, based on the below-described history information, display apparatus 30 of the plurality of display apparatuses to which the line of sight of the driver is more likely to be directed, and cause estimated display apparatus 30 to display an alert image.

Specifically, based on the history information, second selector 58 selects, as a display apparatus for displaying the alert image, a display apparatus from among the plurality of display apparatuses 30 to which the line of sight of the driver is more likely to be directed, and causes selected display apparatus 30 to display the alert image.

The history information includes, for example, a line-of-sight detection history, an information display history, and the like.

The following information can be presented as examples of the line-of-sight detection history.

(1) The cumulative time when the line of sight has been directed to display apparatus selected by first selector 57 in the past.

(2) The number of times the line of sight has been directed to display apparatus 30 selected by first selector 57 in the past.

(3) Information indicating display apparatus 30 to which the line of sight has been directed at the latest time among display apparatuses 30 selected by first selector 57 in the past.

The following information can be presented as examples of the information display history.

(1) The cumulative time when the alert image has been displayed on display apparatus selected by first selector 57 in the past.

(2) The number of display times the alert image has been displayed on display apparatus 30 selected by first selector 57 in the past.

(3) Information indicating display apparatus 30 on which the alert image has been displayed at the latest time among display apparatuses 30 selected by first selector 57 in the past.

These pieces of history information may be set in advance in second selector 58 or may be stored in storage unit 52.

(Information Input 54)

The target object detection information outputted from detection information output 26 is inputted to information input 54, and information input 54 transfers the target object detection information to alert image generator 55.

(Alert Image Generator 55)

Alert image generator 55 generates the above-described alert image based on the target object detection information, and inputs the generated alert image to image information output 56.

(Image Information Output 56)

Image information output 56 outputs the alert image generated by alert image generator 55 to display apparatus 30 selected by first selector 57 or second selector 58.

Specifically, upon receiving the identification ID of display apparatus 30 transmitted from first selector 57 or second selector 58, image information output 56 identifies display apparatus 30 corresponding to the identification ID with reference to table information set in storage unit 52 or image information output 56.

Then, image information output 56 outputs the alert image generated by alert image generator 55 to identified display apparatus 30.

(Display Apparatus 30)

Display apparatus 30A includes information input 31, original image generator 32, image superimposition processor 33, and image display 34. Display apparatus 30A is one example of the second apparatus according to the present disclosure.

Display apparatus 30A is, for example, a center display disposed on a vehicle interior.

Display apparatus 30B is configured similarly to display apparatus 30A. Display apparatus 30B is, for example, an in-vehicle meter panel disposed in front of the driver's seat. Display apparatus 30B is one example of the second apparatus according to the present disclosure.

Display apparatus 30C is configured similarly to display apparatus 30A. Display apparatus 30C is, for example, a head-up display. Display apparatus 30C is one example of the second apparatus according to the present disclosure.

Note that the types of display apparatuses 30 disposed in vehicle 200 are not limited to these, and may include, for example, an electronic mirror (for example, an electronic room mirror, an electronic side mirror, or the like) in which an in-vehicle camera and a display are combined.

The number of display apparatuses 30 disposed in vehicle 200 is not limited to three, and may be two, four, or more.

(Information Input 31)

The alert image outputted by image information output 56 is inputted to information input 31, and information input 31 transfers the alert image to image superimposition processor 33.

(Original Image Generator 32)

Original image generator 32 generates original image data and inputs the original image data to image superimposition processor 33. The original image data is data of an image (original image) displayed on image display 34 when a target object with which the vehicle may collide does not exist in the surrounding area of the vehicle.

Specifically, the original image displayed on image display 34 of display apparatus 30A is, for example, a map displayed on a navigational screen, an image for operating an audio device, or the like.

The original image displayed on image display 34 of display apparatus 30B is an image of, for example, a speedometer, a hydraulic pressure gauge, a fuel-remaining-amount gauge, or the like.

The original image displayed on image display 34 of display apparatus 30C is, for example, an image indicating the vehicle speed, an image indicating the vehicle traveling direction, or the like.

(Image Superimposition Processor 33)

Based on the original image and the alert image, image superimposition processor 33 generates superimposed image data representing an image in which the alert image is superimposed on the original image, and inputs the superimposed image data to image display 34.

(Image Display 34)

Image display 34 generates a superimposed image based on the superimposed image data, and displays the superimposed image on the screen of image display 34.

Information input 31, original image generator 32, image superimposition processor 33, and image display 34 are one examples of the second application according to the present disclosure.

According to display apparatus 30 configured as described above, for example, in the case where the distance between the vehicle and the preceding vehicle is narrowed while the driver is gazing at the in-vehicle meter panel of traveling vehicle 200, the alert image is superimposed on the original image on the in-vehicle meter panel toward which the line of sight of the driver is directed.

Therefore, even when the line of sight is not directed forward, it is possible to promptly notify the driver that vehicle 200 is in a situation where the vehicle may collide with an object in the surrounding area of the vehicle. Accordingly, the driver can take a collision avoidance action such as sudden braking.

Next, referring to FIG. 2, an exemplary configuration of information processing system 100 configured by virtualizing a plurality of different guest OSs on hardware will be described.

Figure 2:
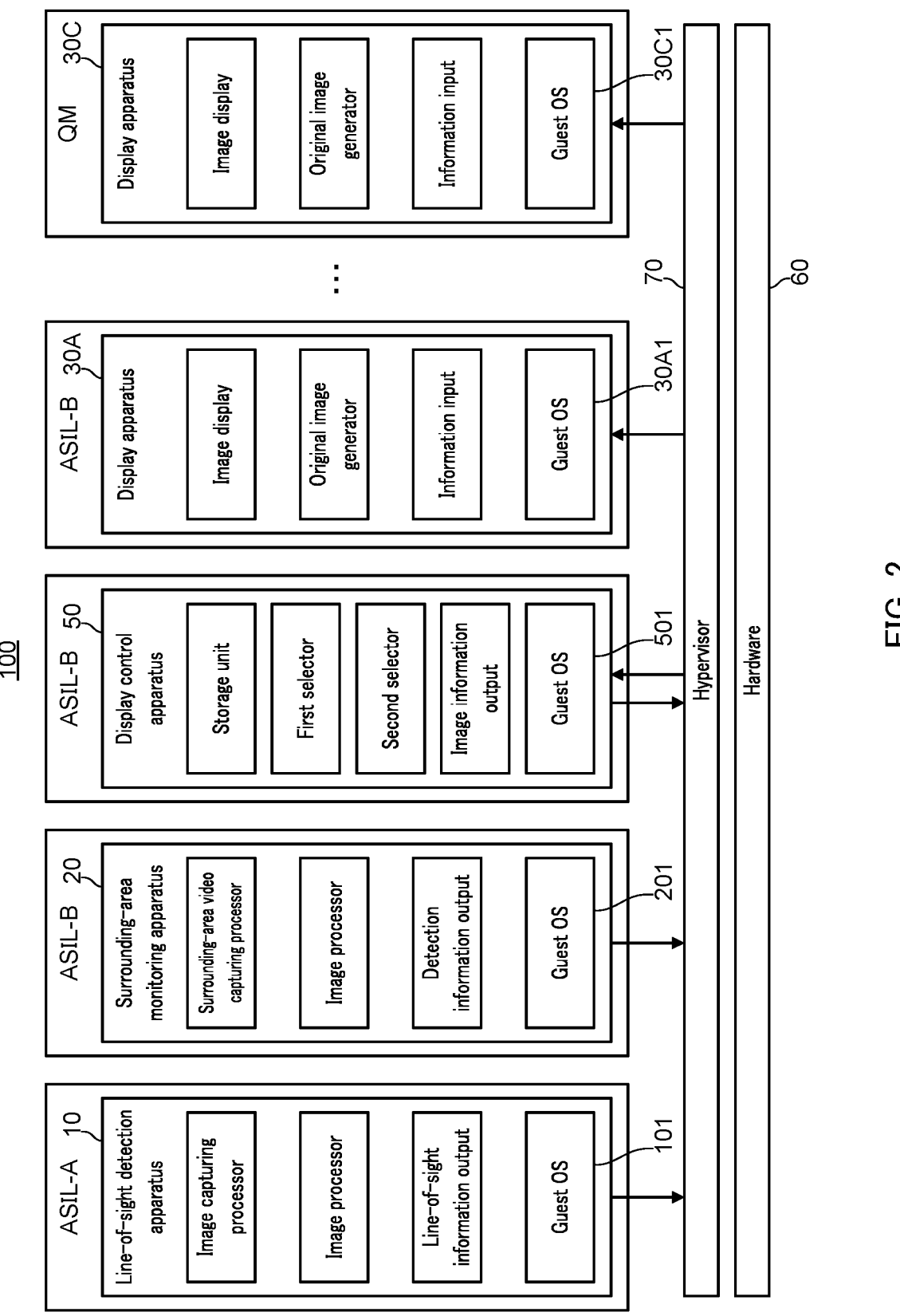
FIG. 2 is an explanatory view for explaining an exemplary configuration of information processing system 100 configured by virtualizing a plurality of different guest OSs on hardware.

FIG. 2 is an explanatory view for explaining an exemplary configuration of information processing system 100 configured by virtualizing a plurality of guest OSs on hardware.

Information processing system 100 includes hardware 60, hypervisor 70, line-of-sight detection apparatus 10, surrounding-area monitoring apparatus 20, display control apparatus 50, and a plurality of display apparatuses 30.

The plurality of display apparatuses 30 include a first display apparatus and a second display apparatus mounted in vehicle 200.

Hardware 60 includes a processor, such as a Central Processing Unit (CPU) (not illustrated) or an Electronic Control Unit (ECU) (not illustrated), to provide an implementation environment for a plurality of computer programs.

Note that hardware 60 may be configured to include one processor or a plurality of processors. The plurality of processors may constitute information processing system 100 according to the present embodiment.

A virtualization layer of hypervisor 70 is generated on hardware 60. Hypervisor 70 is virtualization software that is executed on hardware 60 and controls the execution of a plurality of guest OSs 101, 201, 501, 30A1, and 30C1.

Note that the plurality of guest OSs 101, 201, 501, 30A1, and 30C1 are one examples of the first OS or the second OS according to the present disclosure.

A plurality of types of guest OSs 101, 201, 501, 30A1, and 30C1 can be virtualized and mounted in hardware 60 by hypervisor 70. That is, a plurality of virtual apparatuses (virtual machines) can be realized in one apparatus.

As one example of the hypervisor-type virtualization software, "COQOS Hypervisor SDK," "QNX Hypervisor," or the like can be used in the present embodiment, but the virtualization software is not limited thereto.

Guest OS 101 is an OS that controls the execution of an application for line-of-sight detection apparatus 10 to generate line-of-sight detection information. Guest OS 101 is one example of the first OS according to the present disclosure.

This application is one example of the first application or the second application according to the present disclosure. For example, Automotive Safety Integrity Level (ASIL)-A is applied to the application. Details of the ASIL will be described below.

Guest OS 201 is an OS that controls the execution of an application for surrounding-area monitoring apparatus 20 to generate target object detection information. Guest OS 201 is one example of the first OS according to the present disclosure.

This application is one example of the first application or the second application according to the present disclosure. For example, ASIL-B is applied to the application.

Guest OS 501 is an OS that controls the execution of an application for display control apparatus 50 to generate image information. Guest OS 501 is one example of the first OS or the second OS according to the present disclosure.

This application is one example of the first application or the second application according to the present disclosure. For example, ASIL-B is applied to the application.

Guest OS 30A1 is an OS that controls the execution of an application for display apparatus 30A to display an image. Guest OS 30A1 is one example of the second OS according to the present disclosure.

This application is one example of the second application according to the present disclosure. For example, ASIL-B is applied to the application.

Guest OS 30C1 is an OS that controls the execution of an application for display apparatus 30C to display an image. Guest OS 30C1 is one example of the second OS according to the present disclosure.

This application is one example of the second application according to the present disclosure. For example, ASIL-QM is applied to the application.

Here, above-described ASIL is an index that designates a safety requirement and a safety measure of an automobile that are defined in ISO26262, which is a functional safety standard for the automotive industry.

For ASIL, there are five levels of safety defined: D, C, B, A, and QM. D, C, B, A, and QM are in descending order of safety standards.

For example, airbags, anti-lock braking systems, power steering, and the like are at highest risk from any failure. Accordingly, ASIL-D, which is the most stringent requirement to ensure safety, is applied to these mechanisms.

Note that ASIL-A is applied to the backlight, ASIL-B is applied to the headlight, the brake lamp, and the like, and ASIL-C is applied to the cruise control.

In this case, the descending order of safety standards of guest OSs may be, for example, the order of guest OS 30A1, guest OS 501, and guest OS 30C1.

In information processing system 100 according to the embodiment of the present disclosure, a plurality of virtual machines can be operated in parallel by hypervisor 70.

Therefore, for example, even when a failure occurs in any one of the plurality of display apparatuses 30, the operation of display apparatus 30 having a high safety requirement level can be continued without influence of the above-described failure on the application of other display apparatuses 30 having no failure.

In addition, even when a failure occurs in each of the applications of line-of-sight detection apparatus 10, surrounding-area monitoring apparatus 20, and display control apparatus 50, the operation of display apparatus 30A can be continued without influence of the aforementioned failure on the application of display apparatus 30A having no failure.

Figure 3:
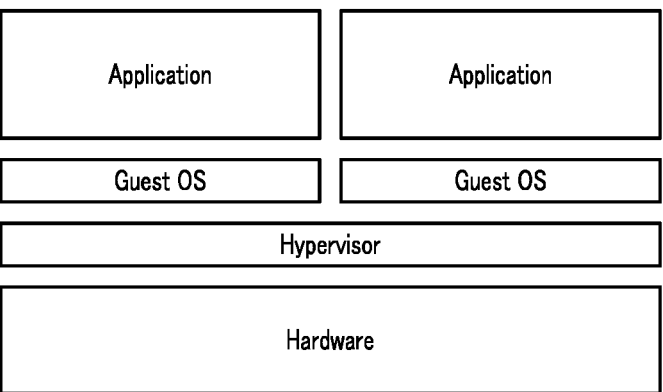
FIG. 3 illustrates an example in which a hypervisor layer is built on hardware and a layer of two guest OSs is built on the hypervisor layer.
Figure 4:
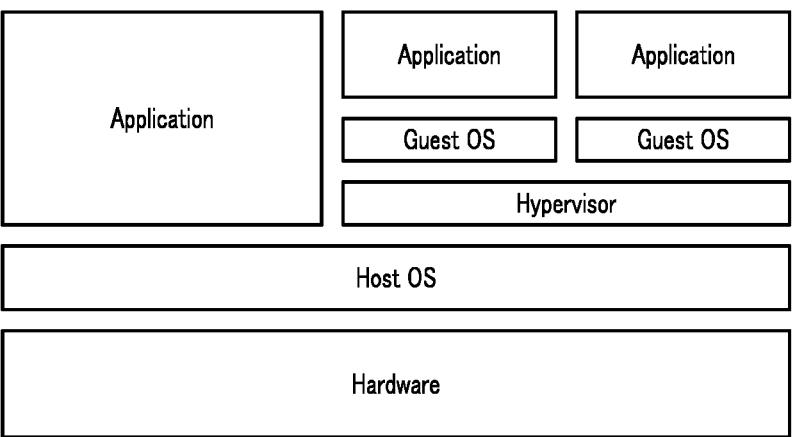
FIG. 4 illustrates an example in which a host OS is built on hardware and a hypervisor is built thereon.

Note that the configuration of information processing system 100 is not limited to the configuration example of FIG. 2, and may be configured as illustrated in FIGS. 3 and 4.

FIG. 3 illustrates an example in which a hypervisor layer is built on hardware and a layer of two guest OSs are built thereon, and FIG. 4 illustrates an example in which a host OS is built on hardware and a hypervisor is built thereon.

The host OS is, for example, an OS that controls the execution of an application for driving control of the vehicle.

Next, the operation of information processing system 100 will be described with reference to FIGS. 5 to 15.

Figure 5:
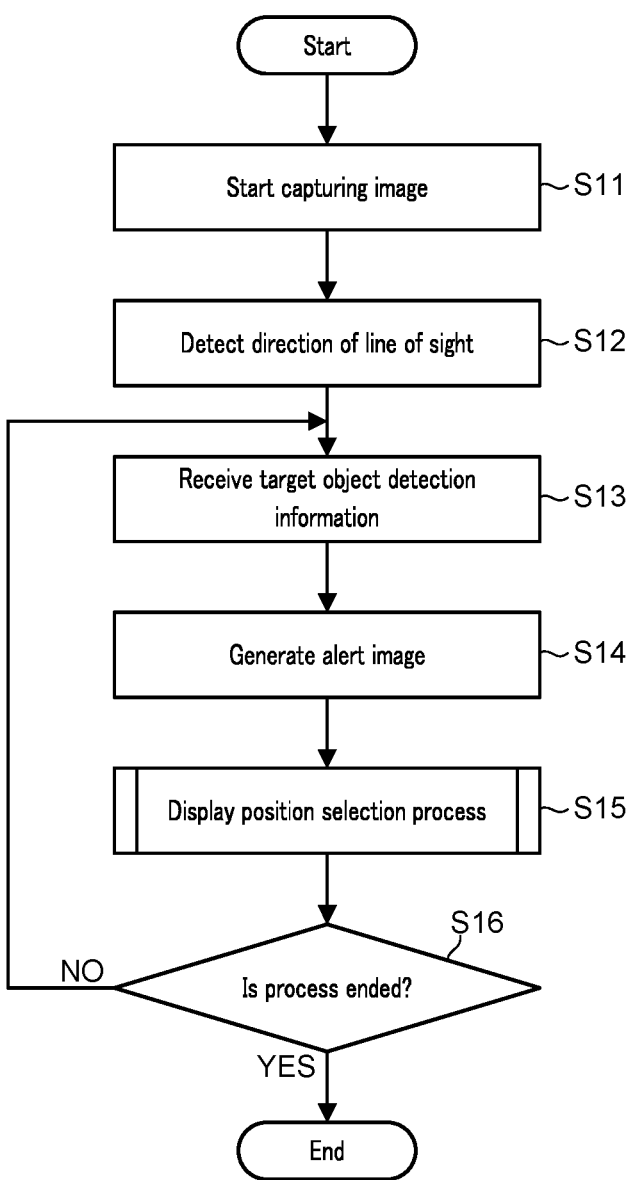
FIG. 5 is a flowchart for explaining an operation of information processing system 100 according to an embodiment of the present disclosure.

FIG. 5 is a flowchart for explaining an operation of information processing system 100 according to the embodiment of the present disclosure.

Image capturing processor 11 starts capturing an image of the driver's face (step S11). The captured image is transmitted to line-of-sight detector 13 via image processor 12.

After the process of step S11, line-of-sight detector 13 detects the direction in which the driver's line-of-sight is directed based on the received image (step S12).

The line-of-sight information, which is the detection result of detection of the line of sight, is transmitted to first selector 57 and second selector 58 via line-of-sight information output 14 and information input 51. Processing of first selector 57 and second selector 58 will be described later.

In conjunction with the processing of step S12, information input 54 receives the target object detection information transmitted by detection information output 26, and transmits the target object detection information to alert image generator 55 (step S13).

After the process of step S13, alert image generator 55 generates an alert image based on the target object detection information (step S14).

After the process of step S14, alert image generator 55 transmits the generated alert image to image information output 56. Thereafter, a display position selection process illustrated in step S15 is executed.

Figure 6A:
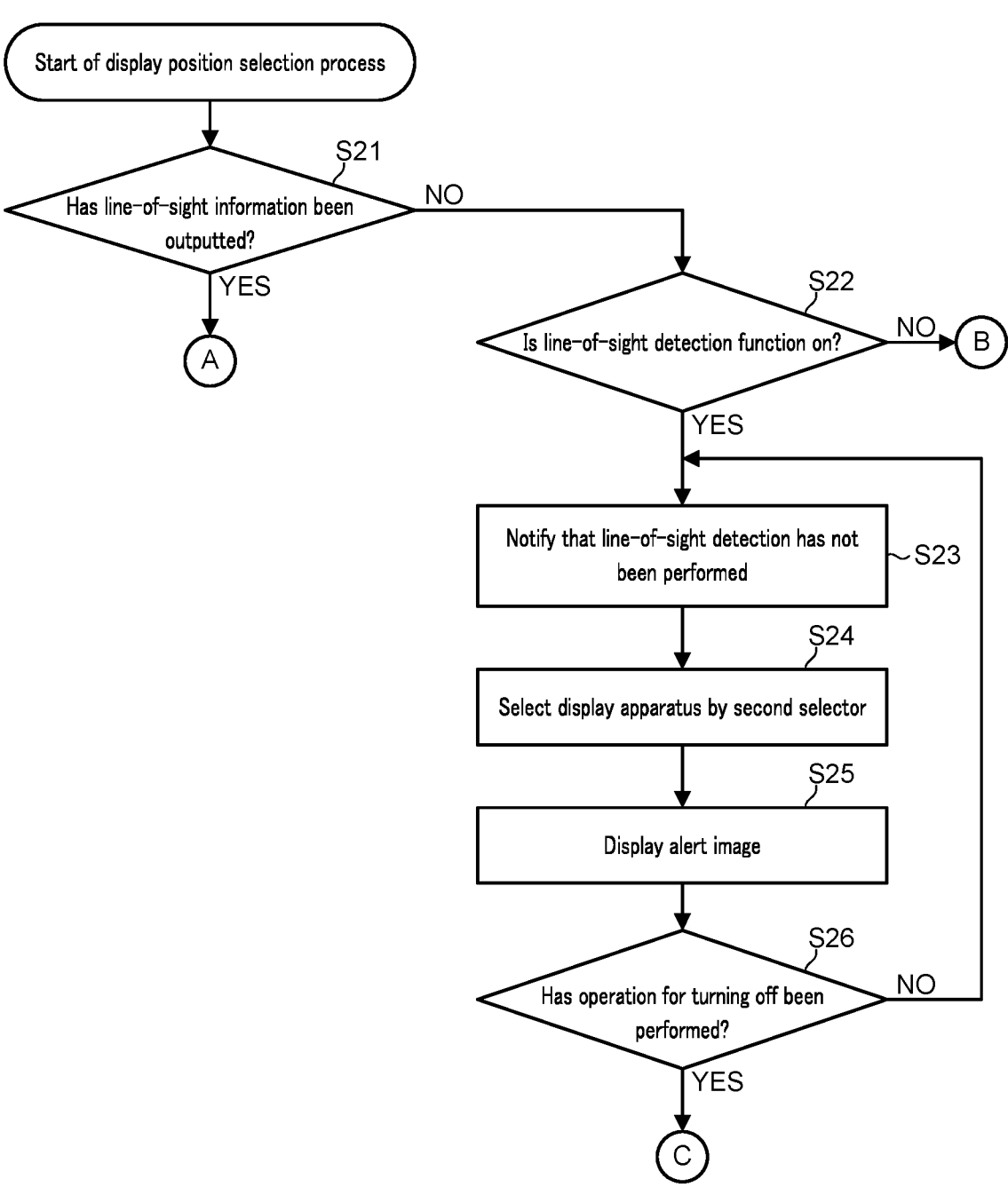
FIG. 6A is a flowchart for explaining the display position selection process.
Figure 6B:
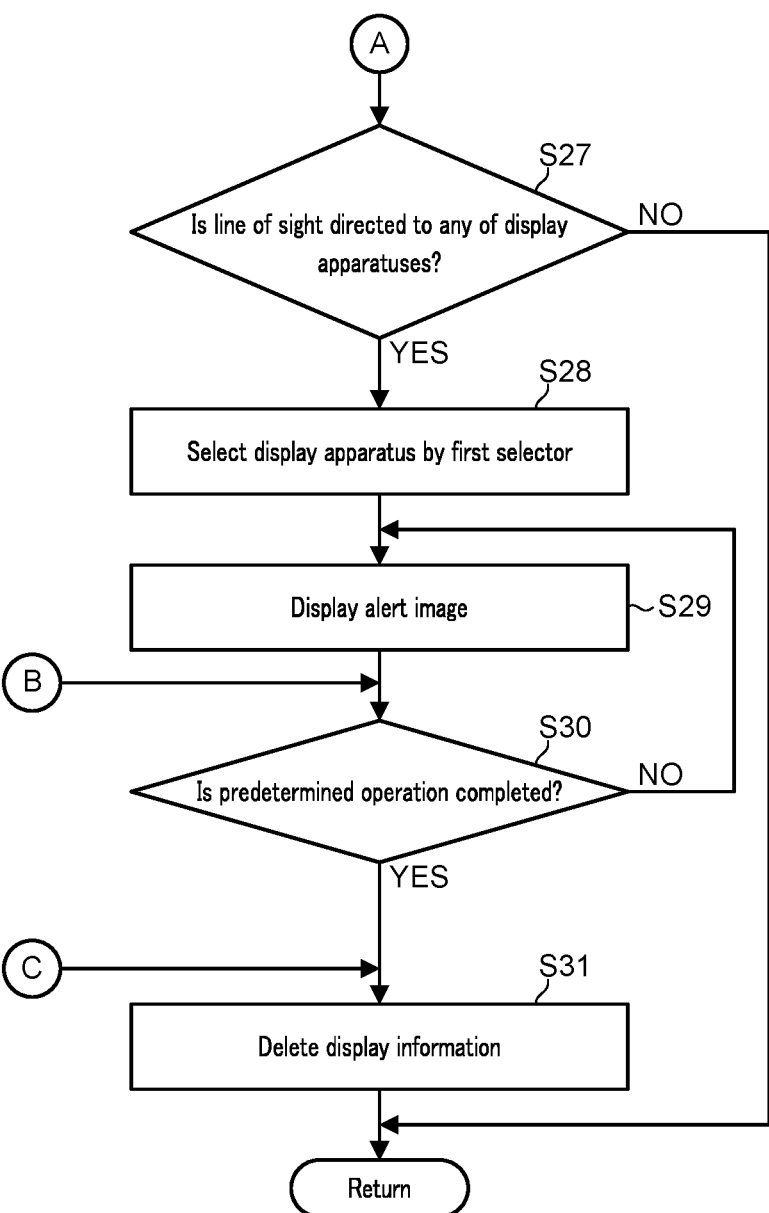
FIG. 6B is a flowchart for explaining the display position selection process.

Referring to FIGS. 6A and 6B, the display position selection process illustrated in step S15 will be described.

FIGS. 6A and 6B are flowcharts for explaining the display position selection process.

Display control apparatus 50 determines whether or not line-of-sight information has been outputted (step S21).

When the line-of-sight information has not been outputted (step S21: NO), the process of step S22 is executed.

In step S22, a process of determining whether a line-of-sight detection function has been activated or the line-of-sight detection function has been stopped by an operation by a driver or the like is executed.

Specifically, in above-described step S21, when the line-of-sight information has not been outputted, display control apparatus 50 determines whether the line-of-sight detection function by line-of-sight detection apparatus 10 is in an on state or an off state (step S22).

The on state is a state in which the line-of-sight detection function of line-of-sight detection apparatus 10 has been activated, and the off state is a state in which the line-of-sight detection function of line-of-sight detection apparatus 10 has been stopped.

The driver can select whether the line-of-sight detection function is on or off. For example, when the line-of-sight detection function is set to "ON," a signal indicating the state in which the line-of-sight detection function has been activated is transmitted from line-of-sight detection apparatus 10 to display control apparatus 50.

When the line-of-sight detection function is set to "OFF," a signal indicating the state in which the line-of-sight detection function has been stopped is transmitted from line-of-sight detection apparatus 10 to display control apparatus 50.

Display control apparatus 50 is capable of determining based on these signals whether the line-of-sight detection function has been activated or the line-of-sight detection function has been stopped by an operation by a driver or the like.

When the line-of-sight detection function of line-of-sight detection apparatus 10 is off (step S22: NO), display control apparatus 50 determines that the line-of-sight information has not been outputted because the line-of-sight detection function has been turned off by the driver. In this case, the process of step S30 is executed, and displaying the alert image is continued. The process of step S30 will be described later.

When the line-of-sight detection function of line-of-sight detection apparatus 10 is in the on state (step S22: YES), display control apparatus 50 determines that the line-of-sight information has not been outputted because the line-of-sight cannot be normally detected.

In this case, the driver is notified that the line-of-sight detection is not performed although the line-of-sight detection function is in the on state (step S23).

As the notification method, for example, a message such as "no line of sight has been detected" may be displayed on display apparatus 30, or a voice may be reproduced from a speaker in the vehicle.

In addition, the notification method may be to blink a lamp inside the vehicle or to vibrate a steering, a seat, or the like.

At this time, display apparatus 30 may display a message for prompting the driver to confirm whether the camera is fogging, a message for prompting the driver to confirm whether the face is covered with a mask or the like, or other messages.

After step S23, second selector 58 selects display apparatus 30 (step S24). As a result, the alert image is displayed on selected display apparatus 30 (step S25).

Note that the processes of step S24 and step S25 may be executed after the completion of the process of step S21 and before the process of step S22 is started.

After the process of step S25, display control apparatus 50 determines whether or not an operation for turning off the line-of-sight detection function has been performed (step S26).

For example, display control apparatus 50 causes display apparatus 30 to display a message "Do you want to set the line-of-sight detection function to the off state?" and notifies the driver that the line-of-sight detection function is turned off after the line-of-sight detection function is turned off (step S26: YES). Then, display control apparatus 50 executes processes of step S31 onward.

In addition, when the operation of turning off the line-of-sight detection function is not performed even though display apparatus 30 is caused to display the message (step S26: NO), display control apparatus 50 repeats the processes of step S23 onward.

Note that display control apparatus 50 may automatically or manually restart line-of-sight detection apparatus 10, for example, instead of the process of step S26.

By restarting line-of-sight detection apparatus 10, the software may operate normally, and the line of sight may be detectable.

When the line-of-sight information cannot be obtained even when line-of-sight detection apparatus 10 is restarted, display control apparatus 50 generates a message notifying the driver of the fact and displays the message on display apparatus 30. It is thus possible to notify the driver that it is difficult to detect the line of sight even when the apparatus is restarted.

Note that display control apparatus 50 may forcibly turn off the line-of-sight detection function after notifying the driver that the line-of-sight cannot be detected even after the restart.

The process returns to step S21, and when the line-of-sight information has been outputted (step S21: YES), the process of step S27 is executed.

When the line-of-sight information has been outputted in step S21, display control apparatus 50 determines whether the line of sight is directed to any of the plurality of display apparatuses 30 (step S27).

When the line of sight is directed to any one of the plurality of display apparatuses (step S27: YES), first selector 57 executes the process of step S28.

First selector 57 selects display apparatus 30 to which the line of sight is directed (step S28).

When display apparatus 30 is selected in step S28, image information output 56 transmits an alert image to selected display apparatus 30. Accordingly, the alert image is displayed in such a manner as to be superimposed on the original image displayed on display apparatus 30 to which the line of sight is directed (step S29).

Thereafter, display control apparatus 50 determines, for example, whether or not the operation corresponding to the alert image displayed on display apparatus 30 has been completed by the driver (step S30).

For example, when a failure avoidance operation is performed after a message "collision caution" is displayed on the head-up display, display control apparatus 50 determines whether or not the collision avoidance operation has been completed, based on the rotation direction of a steering wheel, the rotation amount of the steering wheel, the depression amount of a brake pedal, the depression amount of an accelerator pedal, and the like.

When the collision avoidance operation has not been completed (step S30: NO), display control apparatus 50 repeats the processes of step S29 onward.

When the collision avoidance operation has been completed (step S30: YES), display control apparatus 50 determines that the operation corresponding to the alert image has been completed, and deletes the alert image (step S31).

Note that the process of step S31 is not limited to this, and may be the following process.

For example, after displaying a confirmation message "Have you avoided collision?" on a touch panel-type center display and when the driver touches the confirmation message, display control apparatus 50 may determine that the operation corresponding to the alert image has been completed and delete the alert image.

The process returns to step S27, and when the line of sight is not directed to any of the plurality of display apparatuses 30 (step S27: NO), the process of step S16 illustrated in FIG. 5 is executed.

In step S16 illustrated in FIG. 5, when the processes up to step S15 have not been completed (step S16: NO), display control apparatus 50 repeats the processes of step S13 onward.

In step S16 illustrated in FIG. 5, when the processes up to step S15 have been completed (step S16: YES), display control apparatus 50 ends the series of processes.

First selector 57 may be configured such that, in a case where the line of sight is not directed to any of the plurality of display apparatuses 30, first selector 57 identifies display apparatus 30 existing at the position closest to the line of sight as display apparatus existing in the direction in which the line of sight of the driver is directed.

In the following, information transmitted between the hypervisor and a plurality of guest OSs will be described.

Figure 7:
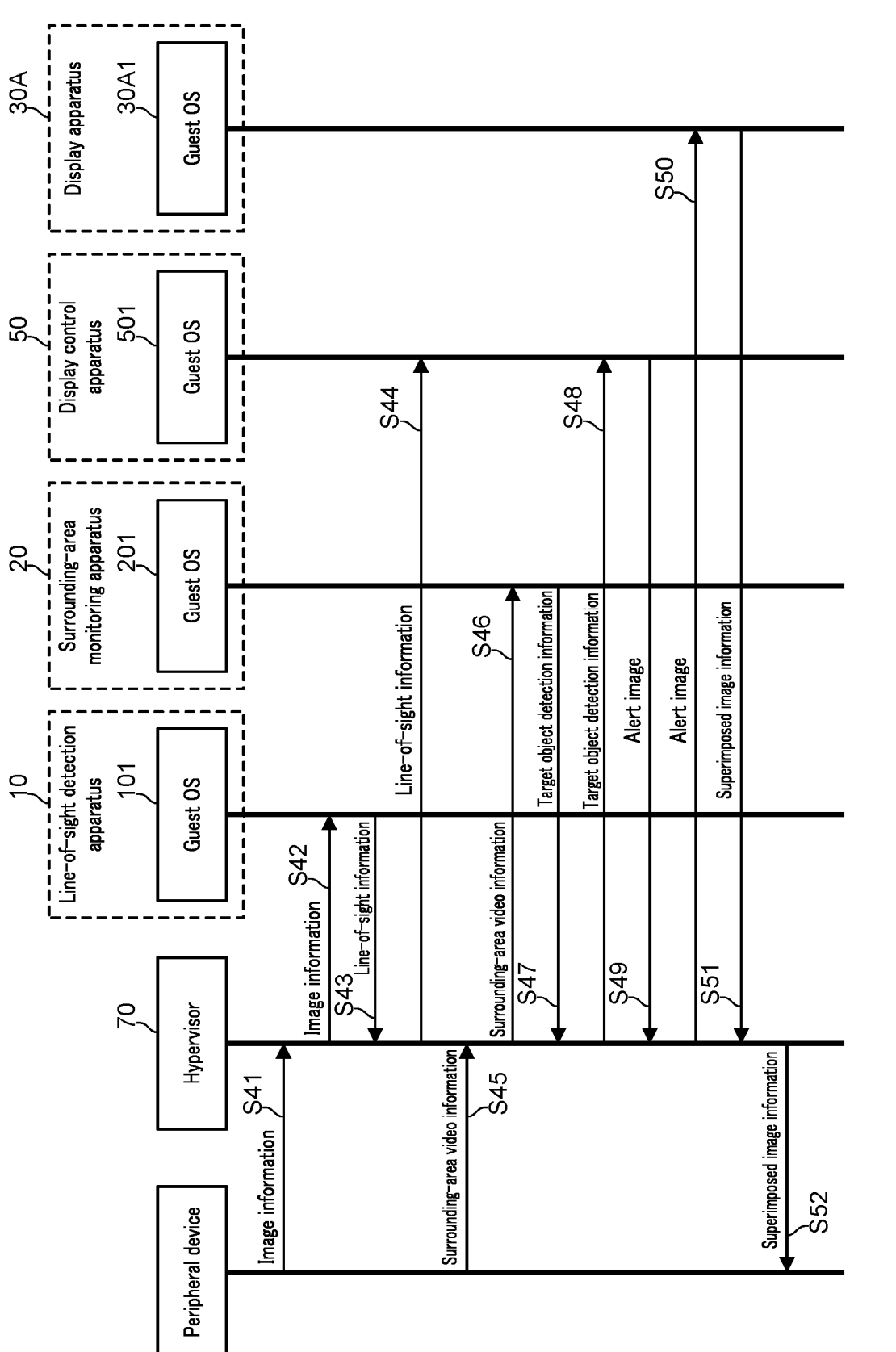
FIG. 7 is a sequence chart for explaining an operation of information processing system 100 performed when no failure occurs in guest OS 101 or the like of line-of-sight detection apparatus 10.

To begin with, referring to FIG. 7, an operation of displaying an alert image on display apparatus 30A performed when no failure occurs in guest OS 101 or the like of line-of-sight detection apparatus 10 will be described FIG. 7 is a sequence chart for explaining an operation of information processing system 100 performed when no failure occurs in guest OS 101 or the like of line-of-sight detection apparatus 10.

Upon receiving the image information transmitted from a peripheral device (for example, image capturing processor 11) (step S41), hypervisor 70 transmits the received image information to guest OS 101 of line-of-sight detection apparatus 10 (step S42).

The application for controlling line-of-sight detection apparatus 10 on guest OS 101 that has received the image information generates line-of-sight information, and guest OS 101 transmits the line-of-sight information to hypervisor 70 (step S43).

Hypervisor 70 transmits the received line-of-sight information to guest OS 501 of display control apparatus 50 (step S44).

Upon receiving surrounding-area video information transmitted from a peripheral device (for example, surrounding-area image capturing processor 21) (step S45), hypervisor 70 transmits the received surrounding-area video information to guest OS 201 of surrounding-area monitoring apparatus 20 (step S46).

The application for controlling surrounding-area monitoring apparatus 20 on guest OS 201 that has received the surrounding-area video information generates target object detection information, and guest OS 201 transmits the target object detection information to hypervisor 70 (step S47).

Hypervisor 70 transmits the received target object detection information to guest OS 501 of display control apparatus 50 (step S48).

Then, the application for controlling display control apparatus 50 on guest OS 501 generates an alert image for display on image display 34 of display apparatus 30A, for example, based on the target object detection information. Then, guest OS 501 transmits the alert image to hypervisor 70 (step S49).

Hypervisor 70 transmits the received alert image to guest OS 30A1 of display apparatus 30A (step S50).

Then, the application of guest OS 30A1 for controlling display apparatus 30A generates the superimposed image information based on the received alert image. Then, guest OS 30A1 transmits the superimposed image information to hypervisor 70 (step S51).

Hypervisor 70 transmits the received superimposed image information to a peripheral device (for example, image display 34 of display apparatus 30A) (step S52).

Consequently, the superimposed image in which the alert image is superimposed on an original image is displayed on image display 34 of display apparatus 30A. An example of the superimposed image will be described later.

Next, referring to FIGS. 8 and 9, an operation performed when a guest OS failure occurs in a part of the apparatuses and then the guest OS is restored under the control of hypervisor 70 will be described.

Here, a situation will be described in which a failure occurs in guest OS 30A1 of display apparatus 30A to which the driver's line of sight is directed, and then guest OS 30A1 is restored under the control of hypervisor 70.

Figure 8:
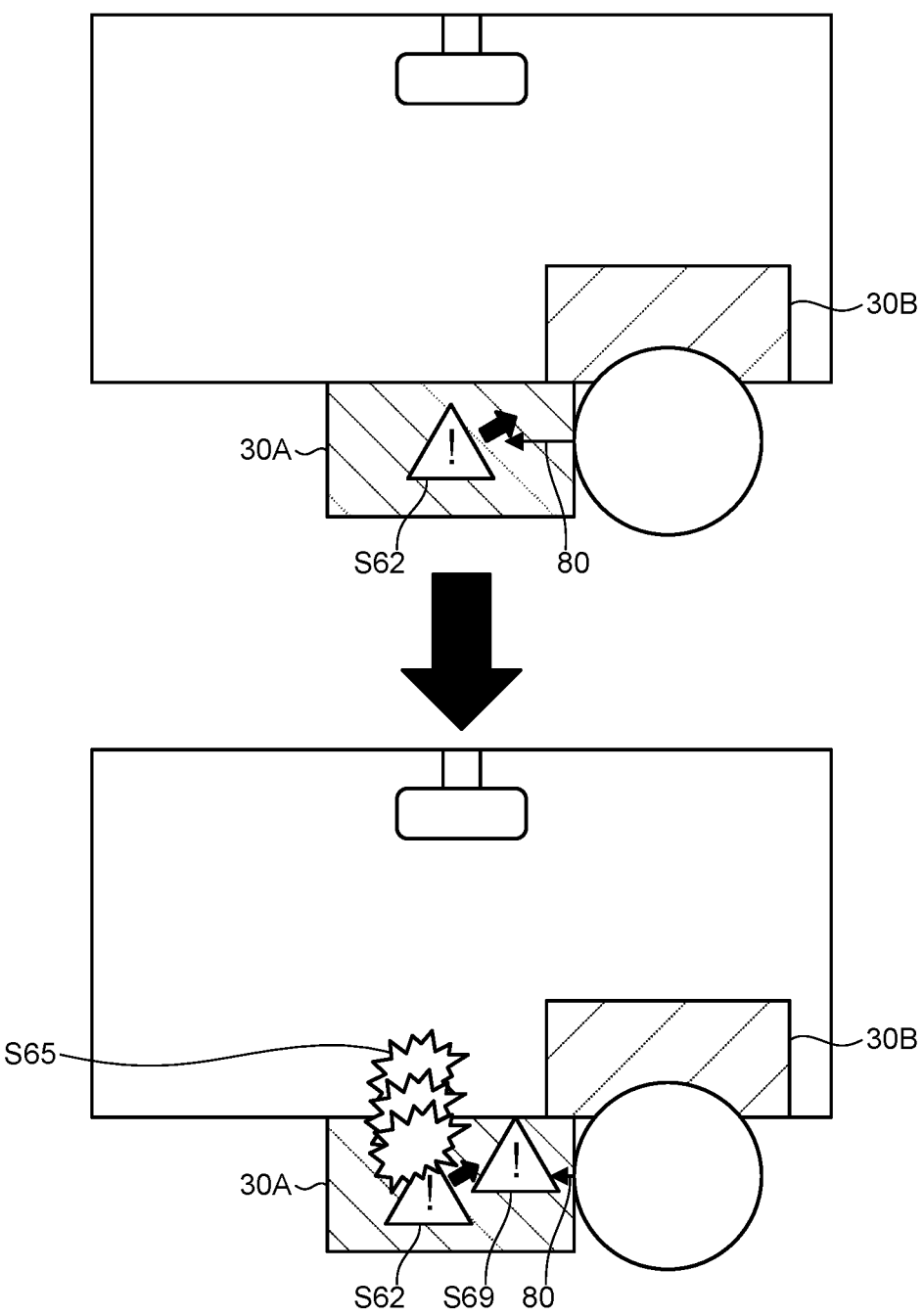
FIG. 8 is an explanatory view for explaining an operation of information processing system 100 performed when a failure occurs in guest OS 30A1 of display apparatus 30A.
Figure 9:
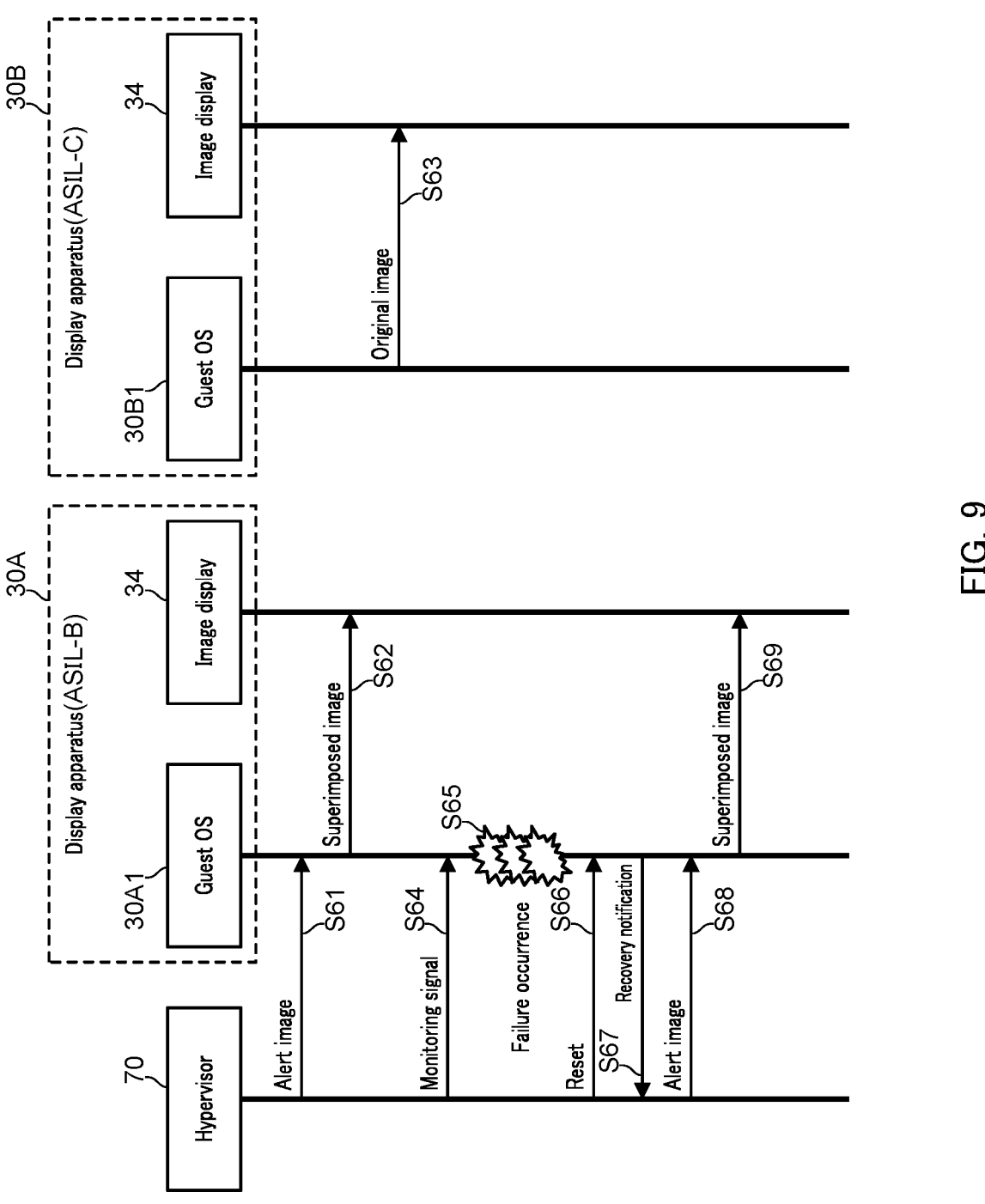
FIG. 9 is a sequence chart for explaining the operation in FIG. 8.

FIG. 8 is an explanatory view for explaining an operation of information processing system 100 performed when a failure occurs in guest OS 30A1 of display apparatus 30A. FIG. 9 is a sequence chart for explaining the operation in FIG. 8.

When receiving the alert image transmitted from guest OS 501 corresponding to display control apparatus 50 illustrated in FIG. 7, for example, hypervisor 70 transmits the received alert image to guest OS 30A1 corresponding to display apparatus 30A to which driver's line of sight 80 is directed (step S61).

When guest OS 30A1 receives the alert image, display apparatus 30A generates a superimposed image based on the received alert image, as illustrated in the upper diagram of FIG. 8.

Then, the application for controlling display apparatus 30A on guest OS 30A1 causes image display 34 of display apparatus 30A to display the generated superimposed image (step S62). For example, ASIL-B is applied to the application.

Note that the application for controlling display apparatus 30B that resides on guest OS 30B1 of display apparatus 30B not having received the alert image causes image display 34 of display apparatus 30B to display only the original image (step S63). For example, ASIL-C is applied to the application.

Hypervisor 70 transmits, to each guest OS, a monitoring signal for monitoring the state of each guest OS such as guest OS 30A1, for example, at a constant cycle (step S64).

When a response signal to the monitoring signal is not returned from any of the guest OSs such as, e.g., guest OS 30A1 within a certain period, hypervisor 70 determines that a failure has occurred in the corresponding guest OS (step S65).

For example, when a failure occurs in guest OS 30A1, hypervisor 70 transmits a reset signal to guest OS 30A1 (step S66).

Upon receiving the reset signal, guest OS 30A1 performs a failure recovery process based on the reset signal.

After recovery from the failure, guest OS 30A1 transmits, to hypervisor 70, a recovery notification indicating that the recovery from the failure has been done (step S67).

Upon receiving the recovery notification, hypervisor 70 transmits the alert image to guest OS 30A1 again (step S68).

When guest OS 30A1 receives the alert image, image superimposition processor 33 of display apparatus 30A that exists in the direction in which driver's line of sight 80 is directed generates the superimposed image based on the alert image.

Then, as illustrated in the lower diagram of FIG. 8, the application for controlling display apparatus 30A of guest OS 30A1 causes the generated superimposed image to be displayed again on image display 34 of display apparatus 30A that exists in the direction of driver's line of sight 80 (step S69).

Next, referring to FIGS. 10 and 11, an operation performed when a failure occurs in a guest OS of a part of the display apparatuses, and then the line of sight is moved to another display apparatus prior to the completion of restoration of guest OS will be described.

Here, a description will be given of a situation in which a failure occurs in guest OS 30A1 of display apparatus 30A existing in the direction in which driver's line of sight 80 is directed, and then line of sight 80 moves from display apparatus 30A to display apparatus 30B prior to the completion of restoration of guest OS 30A1.

Figure 10:
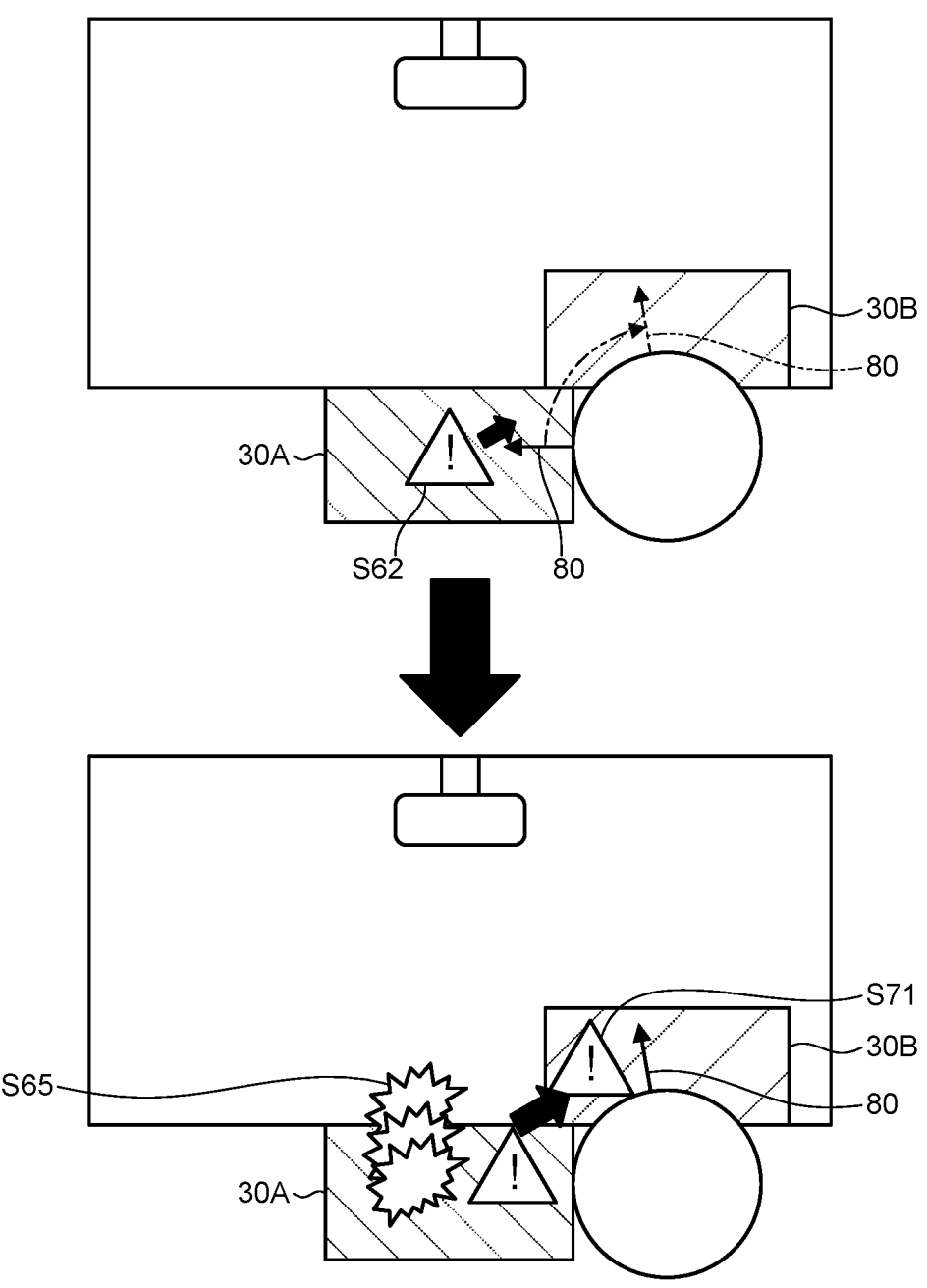
FIG. 10 is an explanatory view for explaining the operation of information processing system 100 performed when a failure occurs in guest OS 30A1 of display apparatus 30A.
Figure 11:
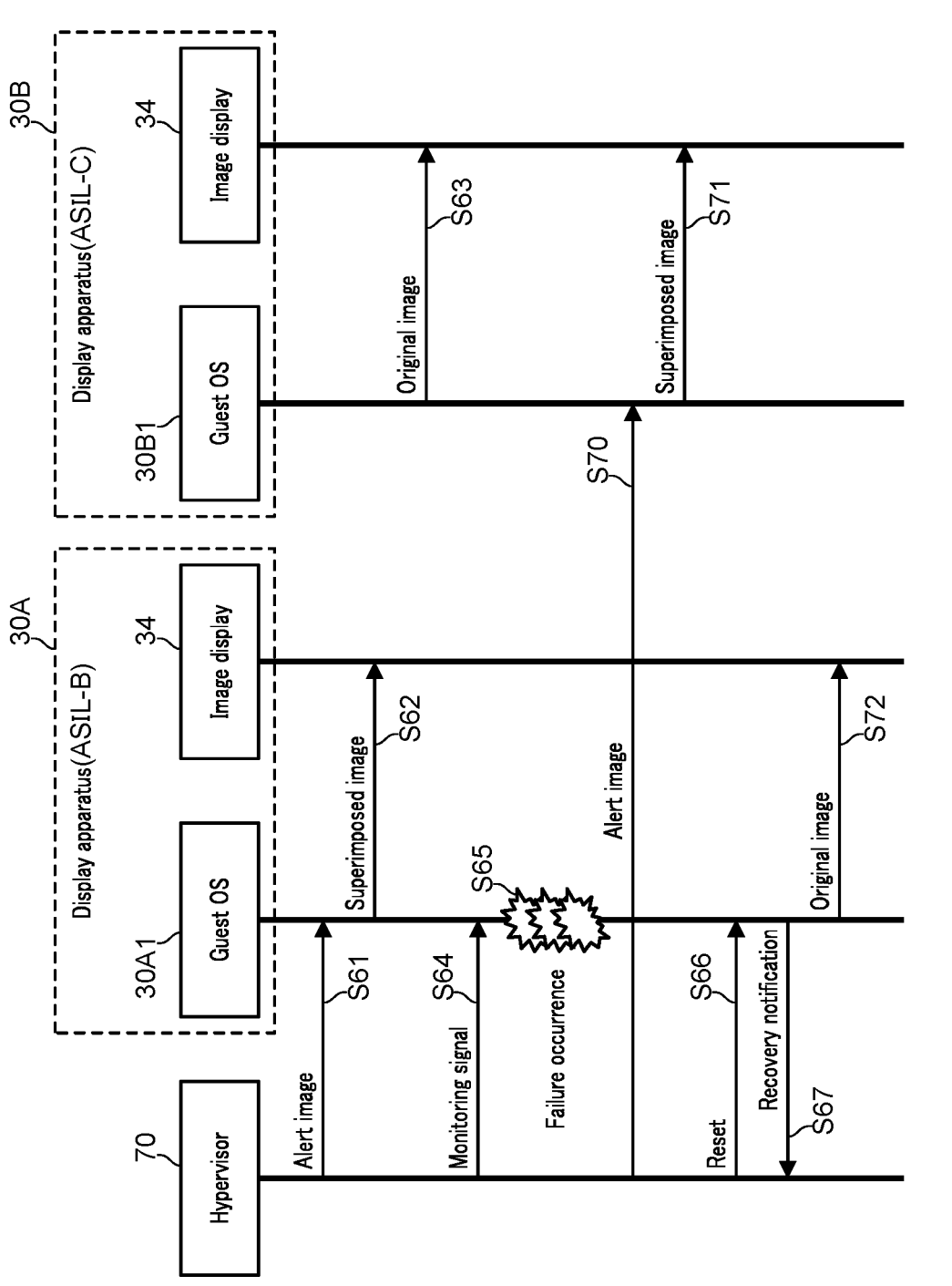
FIG. 11 is a sequence chart for explaining the operation in FIG. 10.

FIG. 10 is an explanatory view for explaining an operation of information processing system 100 performed when a failure occurs in guest OS 30A1 of display apparatus 30A. FIG. 11 is a sequence chart for explaining the operation in FIG. 10.

In the following, description of the processing similar to the processing illustrated in FIG. 9 will be omitted, and processing different from the processing illustrated in FIG. 9 will be described.

It is assumed that, after a failure occurs in guest OS 30A1, driver's line of sight 80 moves from display apparatus 30A to display apparatus 30B as illustrated in the upper diagram of FIG. 10, prior to transmission of the reset signal to guest OS 30A1 by hypervisor 70.

Here, the destination of the alert image is not display apparatus 30A, but display apparatus 30B positioned in the direction of current driver's line of sight 80.

Accordingly, when receiving the alert image transmitted from guest OS 501 of display control apparatus 50, hypervisor 70 transmits the received alert image to guest OS 30B1 of display apparatus 30B (step S70).

When guest OS 30B1 receives the alert image, image superimposition processor 33 of display apparatus 30B generates the superimposed image based on the received alert image.

Then, the application for controlling display apparatus 30B on guest OS 30B1 causes image display 34 of display apparatus 30B to display the superimposed image as illustrated in the lower diagram of FIG. 10 (step S71).

Thereafter, the application for controlling display apparatus 30A on guest OS 30A1 causes image display 34 of display apparatus 30A to display the original image generated by original image generator 32 of display apparatus 30A when guest OS 30A1 corresponding to display apparatus 30A is restored by the reset signal received in step S66 (step S72).

In FIGS. 8 to 11, the operation example in a case where a failure occurs in guest OS 30A1 of display apparatus 30A has been described. In the following, another operation example in a case where a failure occurs in guest OS 101 of line-of-sight detection apparatus having a lower safety requirement level will be described with reference to FIG. 12.

In the following, description of the processing similar to the processing illustrated in FIG. 7 will be omitted, and processing different from the processing illustrated in FIG. 7 will be described.

Figure 12:
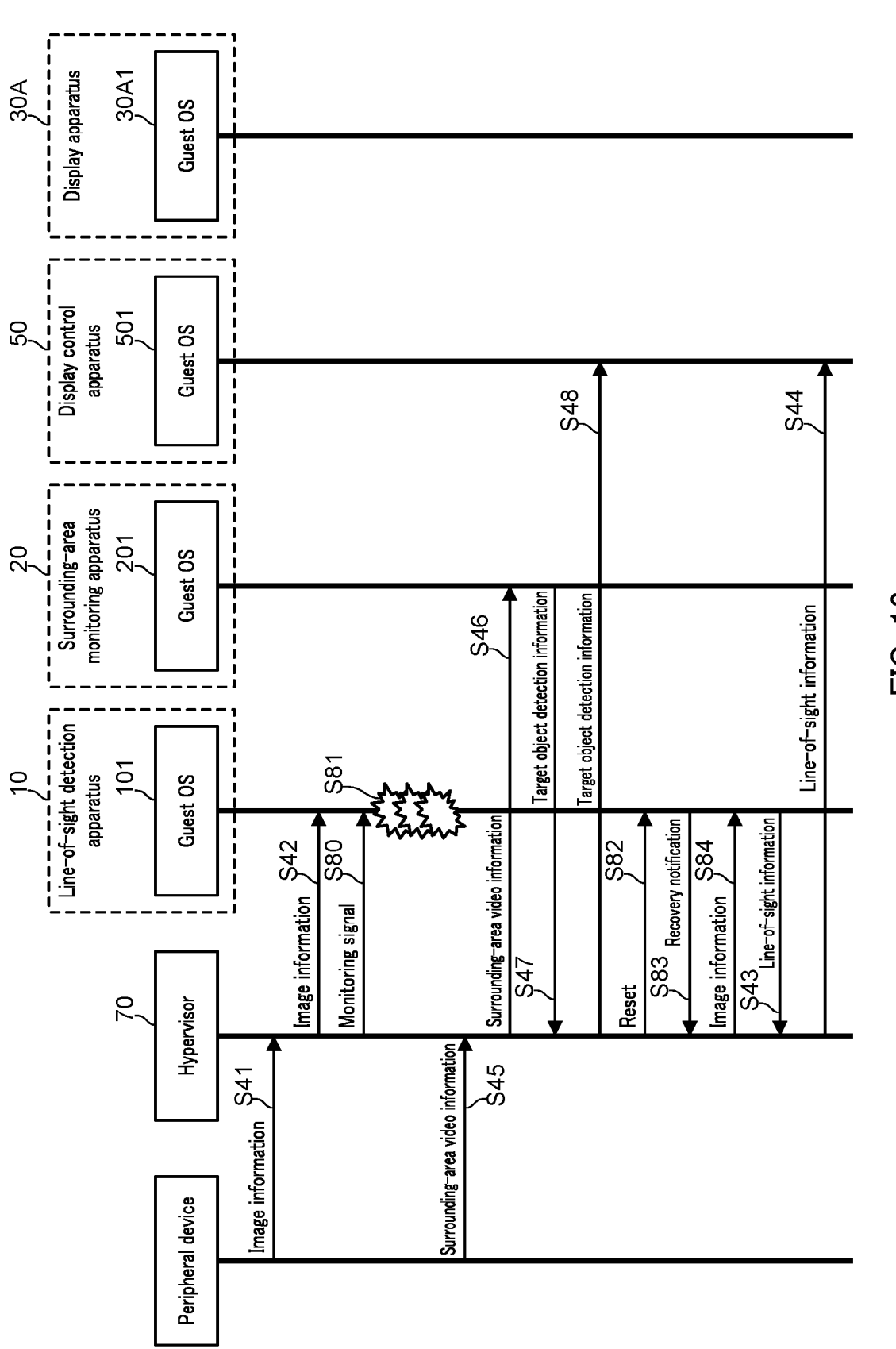
FIG. 12 is a sequence chart for explaining an operation of information processing system 100 performed when a failure occurs in guest OS 101 of line-of-sight detection apparatus 10.

FIG. 12 is a sequence chart for explaining an operation of information processing system 100 performed when a failure occurs in guest OS 101 of line-of-sight detection apparatus 10.

Upon receiving the image information transmitted from the peripheral device (for example, image capturing processor 11) (step S41), hypervisor 70 transmits the received image information to guest OS 101 of line-of-sight detection apparatus 10 (step S42).

Hypervisor 70 transmits, to each guest OS, a monitoring signal for monitoring the state of each guest OS such as guest OS 30A1, for example, at a constant cycle (step S80).

When a response signal to the monitoring signal is not returned from any of the guest OSs such as, e.g., guest OS 30A1 within a certain period, hypervisor 70 determines that a failure has occurred in the corresponding guest OS (step S81).

For example, when a failure occurs in guest OS 101 of line-of-sight detection apparatus 10, hypervisor 70 transmits a reset signal to guest OS 101 (step S82).

Upon receiving the reset signal, guest OS 101 performs a failure recovery process based on the reset signal.

After recovery from the failure, guest OS 101 transmits, to hypervisor 70, a recovery notification indicating that the recovery from the failure has been done (step S83).

Upon receiving the recovery notification, hypervisor 70 transmits the image information to guest OS 101 again (step S84).

Guest OS 101 that has received the image information generates line-of-sight information and transmits the line-of-sight information to hypervisor 70 (step S43).

Hypervisor 70 transmits the received line-of-sight information to guest OS 501 of display control apparatus 50 (step S44).

Next, a monitoring process operation of each guest OS will be described referring to FIGS. 13 to 15.

Example 1 of Monitoring Process of Guest OS

Figure 13:
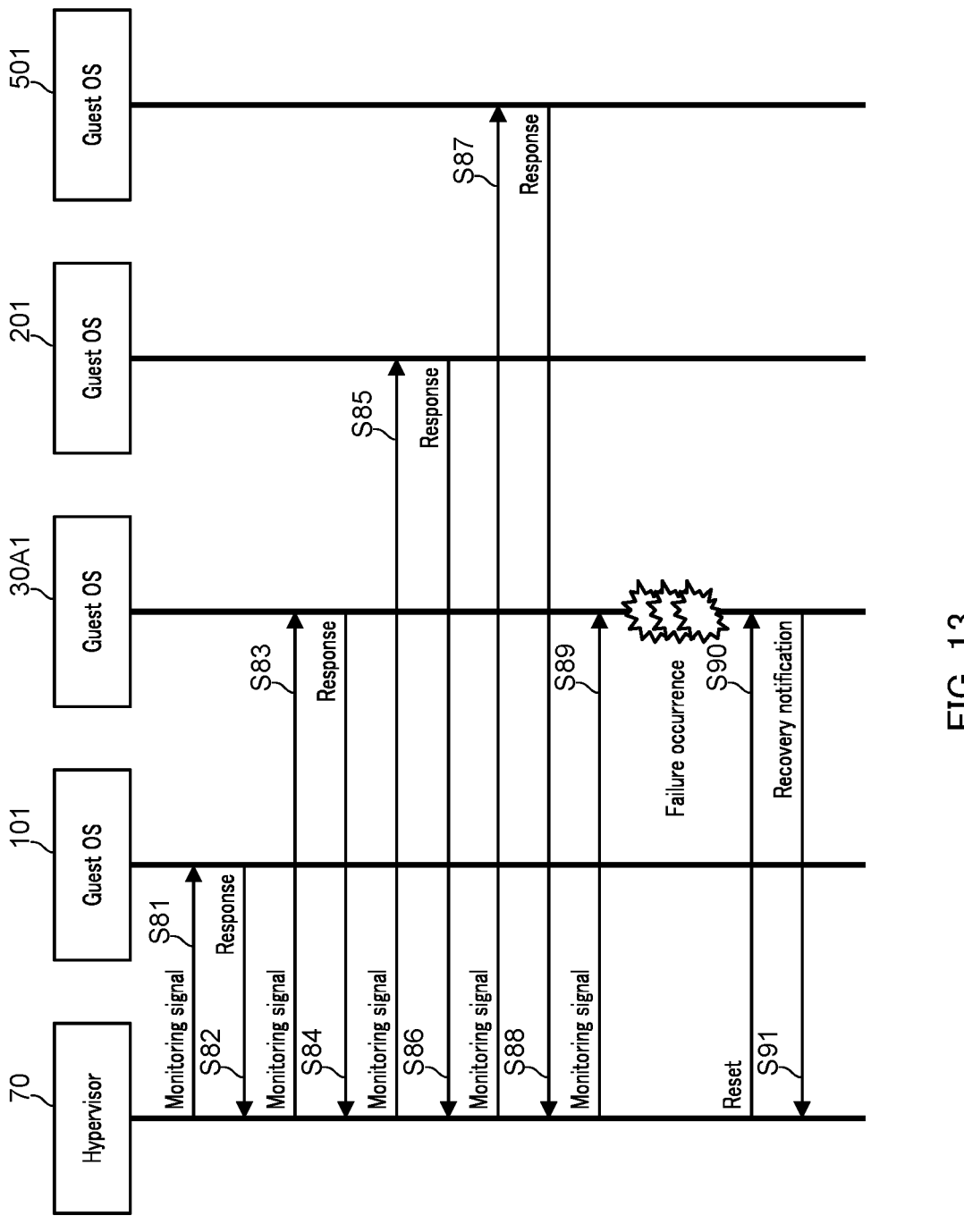
FIG. 13 is a sequence chart for explaining an exemplary operation of information processing system 100 performed when hypervisor 70 monitors guest OSs.

FIG. 13 is a sequence chart for explaining an exemplary operation of information processing system 100 performed when hypervisor 70 monitors each guest OS.

In steps S81 to S89, hypervisor 70 performs a monitoring process for monitoring each guest OS.

Specifically, hypervisor 70 first transmits a monitoring signal to each guest OS. Then, hypervisor 70 receives a response of each guest OS to the monitoring signal from each guest OS to monitor the state of each guest OS.

In step S89, it is assumed that a failure occurs in guest OS 30A1 after the monitoring signal is transmitted to guest OS 30A1.

Then, hypervisor 70 transmits a reset signal to guest OS 30A1 (step S90).

When guest OS 30A1 is restored by the reset signal, guest OS 30A1 transmits, to hypervisor 70, a recovery notification indicating that the recovery from the failure has been done (step S91).

Example 2 of Monitoring Process of Guest OS

As a variation, monitoring each guest OS may be performed by monitoring guest OS 90 included in information processing system 100, instead of being performed by hypervisor 70.

Here, monitoring guest OS 90 is one example of the third OS according to the present disclosure. Monitoring guest OS 90 is capable of controlling the execution of a predetermined monitoring application for detecting an occurrence of a failure associated with any of the guest OSs. The monitoring application is one example of the third application for detecting an occurrence of a failure associated with any of the first OS and second OS.

Monitoring guest OS 90 may be included in display control apparatus 50 or may be included in another apparatus in information processing system 100.

Figure 14:
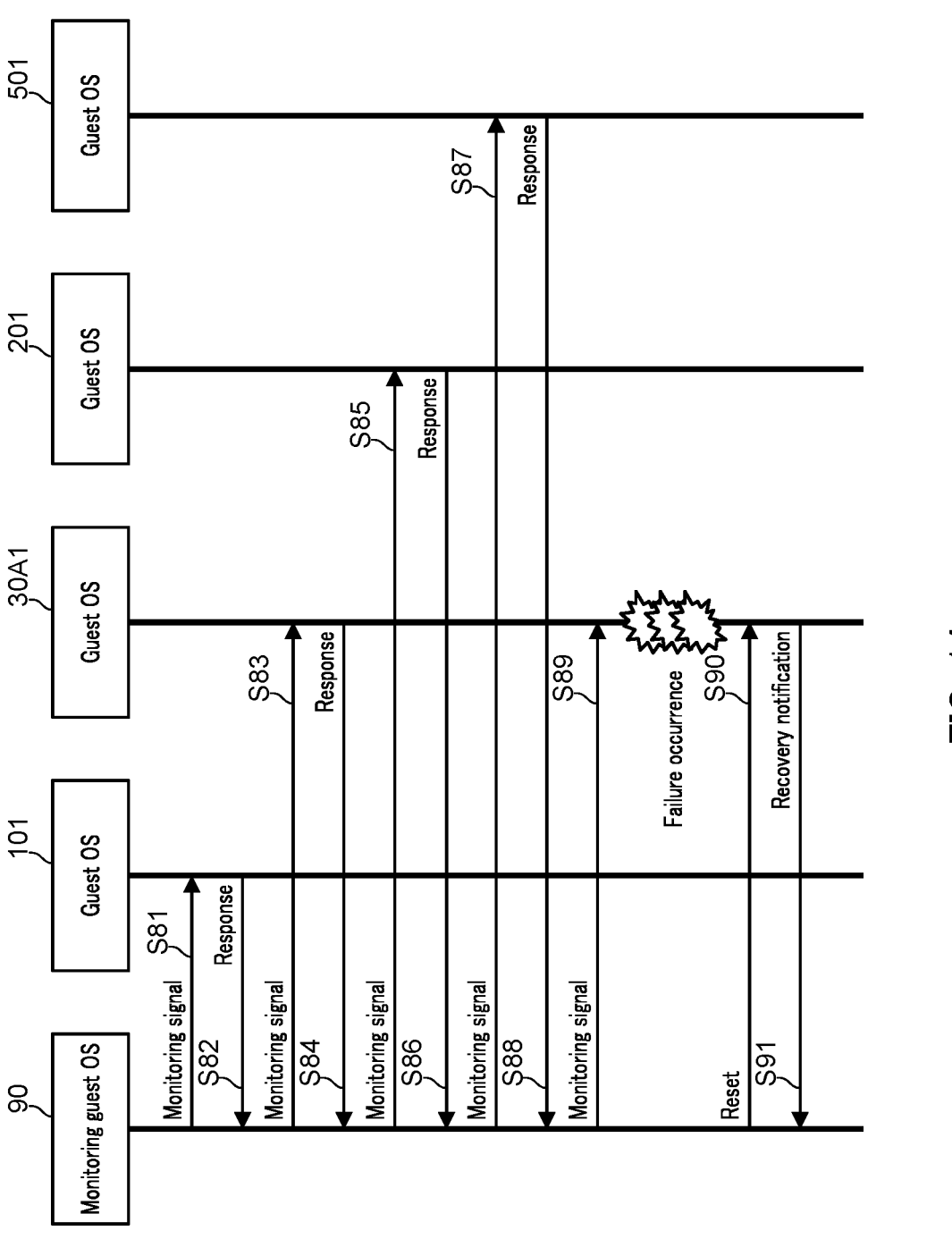
FIG. 14 is a sequence chart for explaining an exemplary operation of information processing system 100 performed when monitoring guest OS 90 monitors the state of each guest OS.

FIG. 14 is a sequence chart illustrating an exemplary operation of information processing system 100 performed when monitoring guest OS 90 monitors the state of each guest OS.

In FIG. 14, for example, it is assumed that display control apparatus 50 includes monitoring guest OS 90 together with guest OS 501.

As illustrated in FIG. 14, in steps S81 to S89, the monitoring process for monitoring each guest OS is performed by monitoring guest OS 90.

Specifically, monitoring guest OS 90 first transmits a monitoring signal to each guest OS. Then, monitoring guest OS 90 receives a response of each guest OS to the monitoring signal from each guest OS to monitor the state of each guest OS.

When a failure in any of the guest OSs is detected, monitoring guest OS 90 controls execution of an application for generating a reset signal for restoring the corresponding guest OS.

In the embodiment illustrated in FIG. 14, it is assumed that a failure occurs in guest OS 30A1 after step S89.

In this case, monitoring guest OS 90 transmits the reset signal to guest OS 30A1 (step S90).

When guest OS 30A1 is restored by the reset signal, guest OS 30A1 transmits, to monitoring guest OS 90, the recovery notification indicating that the recovery from the failure has been done (step S91).

According to the present variation, monitoring guest OS 90 performs the monitoring process. It is thus possible to reduce the processing load of hypervisor 70. In addition, the program of hypervisor 70 can be simplified.

Example 3 of Monitoring Process of Guest OS

In another instance, each guest OS may be capable of monitoring the states of other guest OSs.

Figure 15:
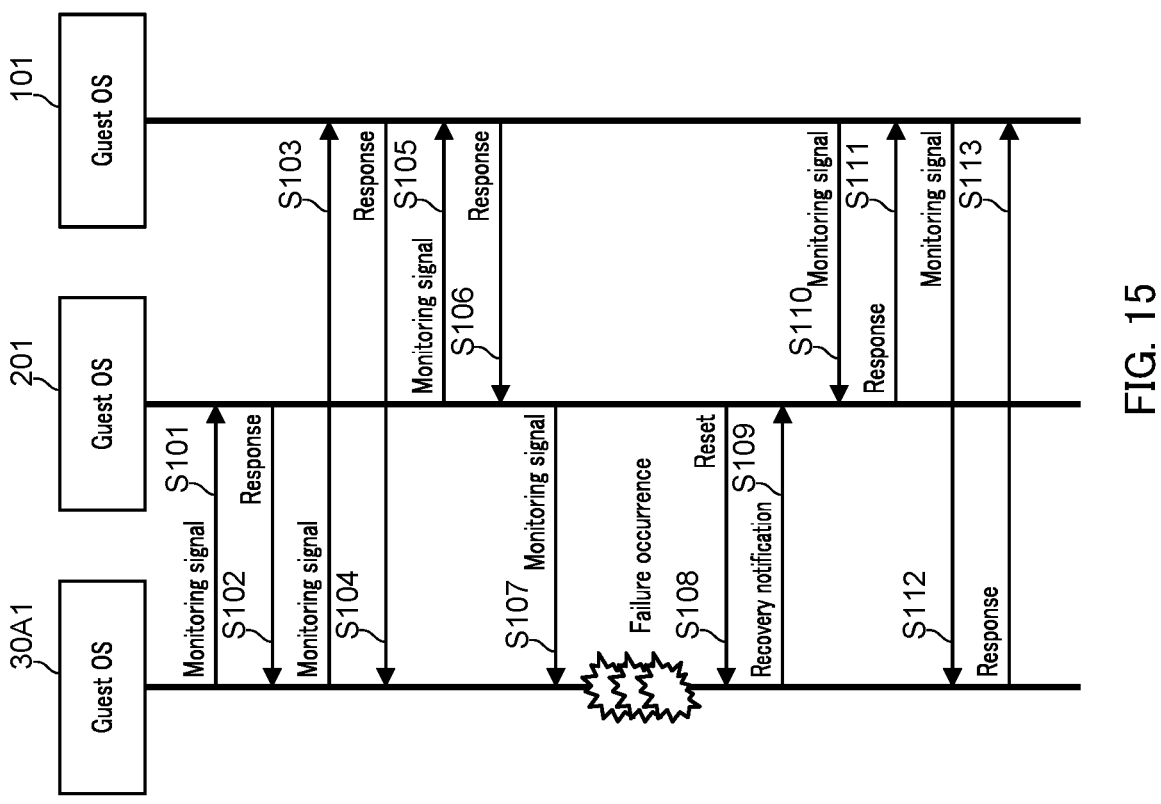
FIG. 15 is a sequence chart illustrating an exemplary operation performed when each guest OS monitors the states of other guest OSs in information processing system 100.

FIG. 15 is a sequence chart illustrating an exemplary operation of information processing system 100 performed when each guest OS monitors the states of other guest OSs.

In the example illustrated in FIG. 15, guest OSs 30A1, 201, and 101 are capable of controlling the execution of an application for each of the guest OSs to monitor the states of other guest OSs.

As illustrated in FIG. 15, in steps S101 to S107, each of the plurality of guest OSs 30A1, 201, and 101 performs the monitoring process for monitoring the states of other guest OSs.

For example, guest OS 30A1 controls the execution of the application for monitoring the state of guest OS 201 and the application for monitoring the state of guest OS 101.

Further, guest OS 201 controls the execution of the application for monitoring the state of guest OS 101 and the application for monitoring the state of guest OS 30A1.

For example, it is assumed that a failure subsequently occurs in guest OS 30A1. Guest OS 201 detects the occurrence of the failure and transmits the reset signal to guest OS 30A1 (step S108).

When guest OS 30A1 is restored by the reset signal, guest OS 30A1 transmits, to guest OS 201, the recovery notification indicating that the recovery from the failure has been done (step S109).

According to this example, even when monitoring guest OS 90 dedicated to monitoring is not prepared, monitoring the state of each guest OS can be realized by modifying the existing guest OSs.

In steps S110 to S113, the same processes as in steps S101 to S107 are performed.

(Effect)

As described above, the information processing apparatus according to the present embodiment includes: a first OS that controls execution of a first application governing an operation of a first apparatus mounted in a vehicle; a second OS that controls execution of a second application governing an operation of a second apparatus that is mounted in the vehicle and that has a safety requirement level higher than a safety requirement level of the first apparatus; and a hypervisor that is executed on a processor and that controls execution of the first OS and the second OS.

With this configuration, hypervisor 70 is capable of operating a plurality of guest OSs in parallel. Thus, when a failure occurs in any one of the plurality of guest OSs, the influence of the failure can remain only in the range of the display apparatus corresponding to the OS. Therefore, it is possible to prevent the display apparatuses corresponding to the other OSs of the plurality of guest OSs from becoming inoperable together.

Therefore, for example, even when a failure occurs in an OS corresponding to line-of-sight detection apparatus 10 having a lower safety requirement level, display control apparatus 50 is capable of continuing a normal process by a different guest OS. It is thus possible to prevent display apparatus 30B or the like having a higher safety requirement level from becoming inoperable.

Further, for example, even when the display of an alert image on the screen of the navigation apparatus is interrupted, the alert image can be displayed on the vehicle-mounted meter panel or the like to which the line of sight is moved, which contributes to the safe driving of the driver.

Figure 16:
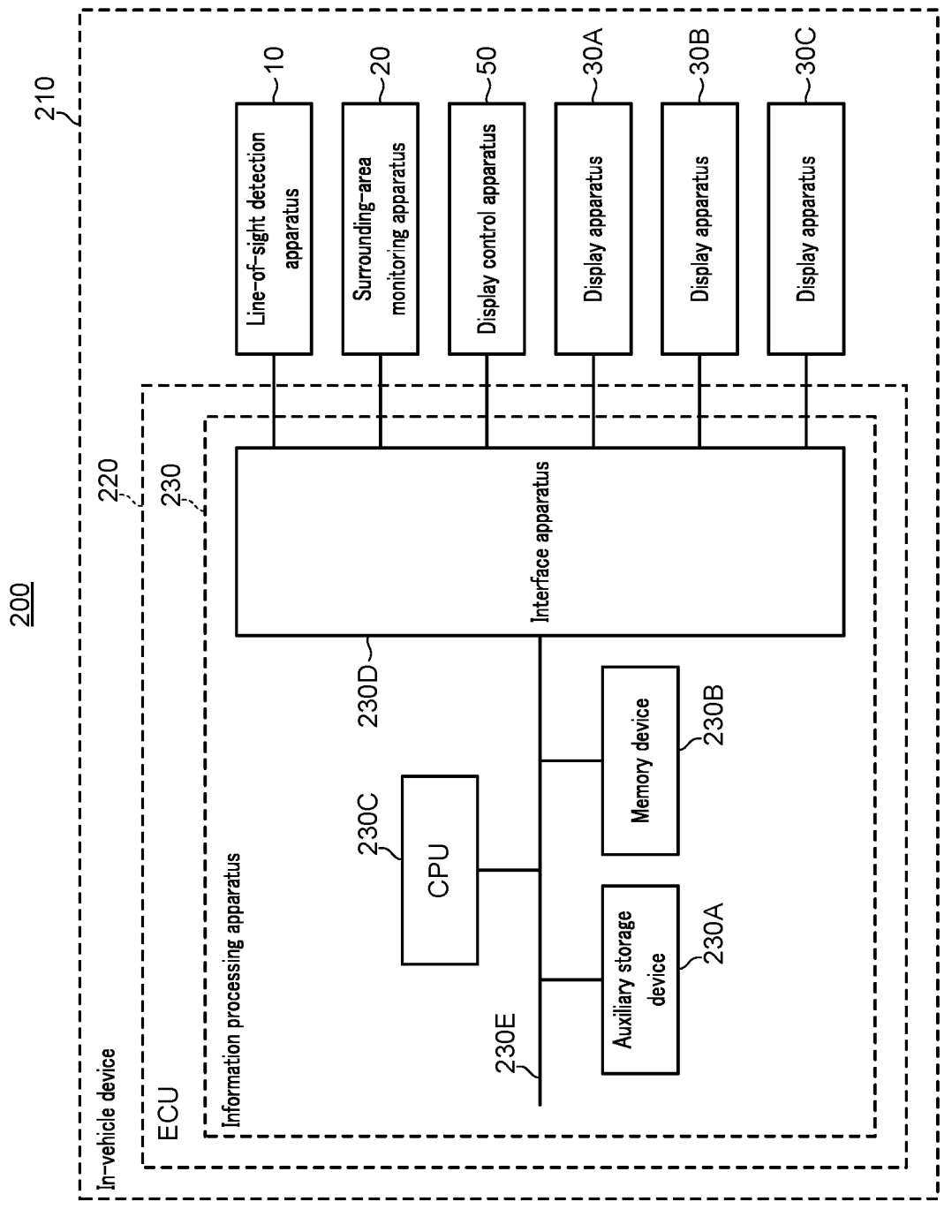
FIG. 16 illustrates an example of a hardware configuration of information processing system 100 according to an embodiment of the present disclosure.

Next, an exemplary hardware configuration of information processing system 100 will be described with reference to FIG. 16. FIG. 16 illustrates an exemplary hardware configuration of information processing system 100 according to the embodiment of the present disclosure.

Vehicle 200 includes, as in-vehicle devices 210, line-of-sight detection apparatus 10, surrounding-area monitoring apparatus 20, display control apparatus 50, display apparatus 30A, display apparatus 30B, display apparatus 30C, and ECU 220.

ECU 220 includes auxiliary storage device 230A, memory device 230B, CPU 230C, and interface apparatus 230D. These apparatuses constitute information processing apparatus 230 and are connected to one another by bus line 230E.

Auxiliary storage device 230A is a Hard Disk Drive (HDD), a flash memory, or the like that stores files and data required for the processes of ECU 220. Memory device 230B reads a program from auxiliary storage device 230A and stores the program when an instruction to start the program is given.

CPU 230C executes a program stored in memory device 230B, and implements various functions of ECU 220 in accordance with the program.

Interface apparatus 230D is, for example, an interface that connects CPU 230C to line-of-sight detection apparatus 10, surrounding-area monitoring apparatus 20, and the like.

Note that, the embodiment of the present disclosure has been described in relation to a configuration example in which the alert image is generated using the target object detection information outputted from surrounding-area monitoring apparatus 20, but the alert image may be generated using vehicle information obtained from various sensors provided in vehicle 200.

The vehicle information is, for example, door opening/closing state information, tire air pressure information, engine water temperature information, travelable distance information, and the like.

The alert image generated based on the door opening/closing state information is, for example, a message "the door is open."

When the door is closed after such a message is displayed on display apparatus 30, display control apparatus 50 determines that the operation corresponding to the alert image has been completed in the above-described process of step S30, and deletes the alert image in the above-described process of step S31.

The alert image generated based on the air pressure information of the tire is, for example, a message "the air pressure exceeds the proper range" or a message "the air pressure is low."

When the air pressure is adjusted to a proper value after such a message is displayed on display apparatus 30, display control apparatus 50 determines that the operation corresponding to the alert image has been completed in the above-described process of step S30, and deletes the alert image in the above-described process of step S31.

The alert image generated based on the water temperature information of the engine is, for example, a message "overheating can be caused."

When the engine is inspected after such a message is displayed on display apparatus 30, display control apparatus 50 determines that the operation corresponding to the alert image has been completed in the above-described process of step S30, and deletes the alert image in the above-described process of step S31.

The alert image generated based on the travelable distance information is, for example, a message "the remaining travelable distance is 10 km."

When fuel is supplied after such a message is displayed on display apparatus 30, display control apparatus 50 determines that the operation corresponding to the alert image has been completed in the above-described process of step S30, and deletes the alert image.

Second selector 58 may be configured as follows.

Second selector 58 may be configured such that when the line-of-sight information is not outputted, second selector 58 selects preset display apparatus 30 as a display apparatus to which the line of sight of the vehicle occupant is more likely to be directed than to the other display apparatuses.

For example, the head-up display is set beforehand as display apparatus 30 for displaying the alert image when the line-of-sight information is not outputted. Accordingly, when the line-of-sight information is not outputted, the alert image can be automatically displayed on the head-up display.

With this configuration, even when the line-of-sight information is not outputted, the alert image can be displayed on display apparatus 30 set in advance as display apparatus to which the line of sight of the vehicle occupant is more likely to be directed. It is thus possible to enhance the safety of driving.

Image information output 56 may be configured as follows.

Image information output 56 may be configured such that, when second selector 58 selects display apparatus 30 to which the line of sight of the vehicle occupant is more likely to be directed than to other display apparatuses 30, image information output 56 generates image information prompting a shift of the line of sight from a first display apparatus among the plurality of display apparatuses 30 which is not selected by second selector 58 to a second display apparatus among the plurality of display apparatuses 30 which is selected by second selector 58, and outputs the image information to the first display apparatus.

In this case, for example, when the line-of-sight information is not outputted, image information output 56 generates a message "see the head-up display."

Then, image information output 56 displays the message on the center display and displays the alert image on the head-up display.

As described above, by displaying the message "see the head-up display" on the center display, the message displayed on the center display allows the driver to notice the alert image displayed on the head-up display, even when the line of sight cannot be detected when the driver directs the line of sight to the center display. Thus, the driver can quickly direct the line of sight to the head-up display.

Therefore, an action corresponding to the alert image can be taken quickly, and the safety of the driving can be further enhanced.

Note that second selector 58 may be configured to select, as display apparatus 30 to which the line of sight of the vehicle occupant is more likely to be directed than to other display apparatuses 30, a terminal apparatus that is portable by the vehicle occupant.

For example, after the terminal apparatus such as a smartphone and the in-vehicle devices mounted on vehicle 200 perform short-range wireless communication with each other by using Bluetooth (registered trademark) or the like and pairing is completed, and when the terminal apparatus is selected by second selector 58, image information output 56 transmits an alert image to the terminal apparatus selected by second selector 58. Thus, it is possible to display the alert image on the terminal apparatus also when the terminal apparatus is used as a navigation apparatus.

Note that, display control apparatus 50 may be configured to determine that the driver has been ignoring the alert image or does not need the operation corresponding to the alert image, and delete the alert image on display apparatus 30, for example, when the operation is not completed after the alert image is displayed for a certain period of time.

After deletion of the alert image, only the original image is displayed on display apparatus 30. It is thus becomes easier for the driver to recognize the original image, and thus, the safety of driving is further enhanced.

Note that display control apparatus 50 may locate the position of an object such as a motorcycle by using information obtained from a sensor that detects an object in the surrounding area of the vehicle, and display an alert image on display apparatus 30 which is disposed between the position and the driver.

For example, when a motorcycle approaching vehicle 200 from the left front of vehicle 200 is detected in vehicle 200 traveling toward an intersection, display control apparatus 50 causes a message such as "risk of collision" to blink on the center display located in the left front of the driver.

Accordingly, it is possible to notify the driver of a situation in which an object may collide with vehicle 200. At this time, display control apparatus 50 may simultaneously output voice guidance that prompts attention. Accordingly, the driver can take the collision avoidance action such as sudden braking, and thus the safety of driving can be further enhanced.

Note that, for example, the following aspects are also understood to fall within the technical scope of the present disclosure.

(1) The information processing apparatus includes: a first OS that controls execution of a first application governing an operation of a first apparatus mounted in a vehicle; a second OS that controls execution of a second application governing an operation of a second apparatus that is mounted in the vehicle and that has a safety requirement level higher than a safety requirement level of the first apparatus; and a hypervisor that is executed on a processor and controls execution of the first OS and the second OS.

(2) The first apparatus is a line-of-sight detection apparatus for detecting a direction in which a line of sight of an occupant of the vehicle is directed, and the second apparatus is a display apparatus specified based on the direction of the line of sight detected by the line-of-sight detection apparatus.

(3) The display apparatus is an apparatus that displays an alert image for notifying the occupant of existence of an object detected by a detection apparatus that detects an object existing in a surrounding area of the vehicle.

(4) When the line-of-sight detection apparatus is not capable of detecting the direction in which the line of sight of the occupant of the vehicle is directed, the second apparatus selects, as the apparatus for displaying the alert image, a display apparatus to which the line of sight of the occupant of the vehicle is likely to be directed, the selecting being based on history information.

(5) The history information is history information on a display apparatus to which the line of sight is directed.

(6) The history information is history information on a display apparatus on which the alert image is displayed.

(7) The second apparatus generates image information prompting a shift of the line of sight to the display apparatus selected as the apparatus for displaying the alert image, and outputs the image information to a display apparatus that is not selected as the apparatus for displaying the alert image.

(8) The second apparatus determines whether or not an operation corresponding to the alert image has been completed, and when the operation corresponding to the alert image is determined to have been completed, the second apparatus deletes the alert image.

(9) The second apparatus deletes the alert image when the operation corresponding to the alert image is not completed after the alert image is displayed for a predetermined time.

(10) The display apparatus to which the line of sight of the occupant of the vehicle is likely to be directed is a terminal apparatus that is portable by the occupant of the vehicle.

(11) The second apparatus displays the alert image on a display apparatus disposed between a position of an object existing in a surrounding area of the vehicle and the occupant of the vehicle.

(12) The display apparatus is an apparatus that displays an alert image generated based on vehicle information obtained from a sensor provided in the vehicle.

(13) The hypervisor detects an occurrence of a failure relevant to any of the first OS and the second OS.

(14) Upon detection of the occurrence of the failure, the hypervisor performs, on an OS in which the failure occurs, a process for restoring the OS.

(15) A third OS that controls execution of a third application for detecting an occurrence of a failure relevant to any of the first OS and the second OS is further comprised.

(16) Upon detection of the occurrence of the failure, the third application performs, on an OS in which the failure occurs, a process for restoring the OS.

(17) Each of the first OS and the second OS detects a failure relevant to another OS.

(18) Upon detection of an occurrence of the failure relevant to the other OS, each of the first OS and the second OS performs, on the other OS, a process for restoring the other OS in which the failure has occurred.

(19) The information processing system includes: the above-described information processing apparatus; the first apparatus; and the second apparatus.

(20) The information processing method includes: controlling, by a first OS, execution of a first application governing an operation of a first apparatus mounted in a vehicle; controlling, by a second OS, execution of a second application governing an operation of a second apparatus that is mounted in the vehicle and has a safety requirement level higher than a safety requirement level of the first apparatus; and controlling, by a hypervisor executed on a processor, execution of the first OS and the second OS.

Various embodiments have been described with reference to the drawings hereinabove. Obviously, the present disclosure is not limited to these examples. Obviously, a person skilled in the art would arrive variations and modification examples within a scope described in the present disclosure, and it is understood that these variations and modifications are within the technical scope of the present disclosure. Moreover, any combination of features of the above-mentioned embodiments may be made without departing from the spirit of the present disclosure.

While concrete examples of the present invention have been described in detail above, those examples are mere examples and do not limit the scope of the appended claims. The techniques disclosed in the scope of the appended claims include various modifications and variations of the concrete examples exemplified in the present disclosure.

The disclosure of Japanese Patent Application No. 2020-208427, filed on Dec. 16, 2020, including the specification, drawings and abstract, is incorporated herein by reference in its entirety.

INDUSTRIAL APPLICABILITY

One exemplary embodiment of the present disclosure is suitable for a display control apparatus and an information processing system.

REFERENCE SIGNS LIST

10 Line-of-sight detection apparatus
11 Image capturing processor
12 Image processor
13 Line-of-sight detector
14 Line-of-sight information output
20 Surrounding-area monitoring apparatus
21 Surrounding-area image capturing processor
22 Image processor
23 Object detection sensor
25 Target object detector
26 Detection information output
30 Display apparatus
30A Display apparatus
30B Display apparatus
30C Display apparatus
31 Information input
32 Original image generator
33 Image superimposition processor
34 Image display
50 Display control apparatus
51 Information input
52 Storage unit
54 Information input
55 Alert image generator
56 Image information output
57 First selector
58 Second selector
60 Hardware
70 Hypervisor
80 Line of sight
100 Information processing system
200 Vehicle
210 In-vehicle device
220 ECU
230 Information processing apparatus
230A Auxiliary storage device
230B Memory device
230C CPU
230D Interface apparatus
230E Bus line

25

The invention claimed is:

1. An information processing apparatus, comprising:
a first Operating System (OS) that controls execution of a first application governing an operation of a first apparatus mounted in a vehicle;
a second OS that controls execution of a second application governing an operation of a second apparatus that is mounted in the vehicle and that has a safety requirement level higher than a safety requirement level of the first apparatus;
a third OS that controls execution of a third application governing an operation of a third apparatus that is mounted in the vehicle; and
a hypervisor that is executed on a processor and controls execution of the first OS, the second OS, and the third OS, wherein
the first apparatus is a line-of-sight detection apparatus for detecting a direction in which a line of sight of an occupant of the vehicle is directed,
the second apparatus and the third apparatus are each a display apparatus specified based on the direction of the line of sight detected by the line-of-sight detection apparatus,
the second apparatus is a center display, and
the third apparatus is a head-up display.

2. The information processing apparatus according to claim 1, wherein
at least one of the second apparatus or the third apparatus is an apparatus that displays an alert image for notifying the occupant of existence of an object detected in a surrounding area of the vehicle.

3. The information processing apparatus according to claim 2, wherein
when the line-of-sight detection apparatus is not capable of detecting the direction in which the line of sight of the occupant of the vehicle is directed, the second apparatus selects, as the apparatus for displaying the alert image, a display apparatus to which the line of sight of the occupant of the vehicle is likely to be directed, based on history information.

4. The information processing apparatus according to claim 3, wherein
the history information is based on display apparatuses to which the line of sight is directed.

5. The information processing apparatus according to claim 3, wherein
the history information is based on display apparatuses on which the alert image is displayed.

6. The information processing apparatus according to claim 3, wherein
the second apparatus generates image information prompting a shift of the line of sight to the apparatus that displays the alert image, and outputs the image information to a display apparatus that is not selected as the apparatus for displaying the alert image.

7. The information processing apparatus according to claim 2, wherein
the second apparatus determines whether or not an operation corresponding to the alert image has been completed, and when the operation corresponding to the alert image is determined to have been completed, the second apparatus deletes the alert image.

8. The information processing apparatus according to claim 7, wherein

26 the second apparatus deletes the alert image when the operation corresponding to the alert image is not completed after the alert image is displayed for a predetermined time.

9. The information processing apparatus according to claim 3, wherein
the display apparatus to which the line of sight of the occupant of the vehicle is likely to be directed is a terminal apparatus that is portable by the occupant of the vehicle.

10. The information processing apparatus according to claim 2, wherein
the second apparatus displays the alert image on a display apparatus disposed between a position of an object existing in a surrounding area of the vehicle and the occupant of the vehicle.

11. The information processing apparatus according to claim 1, wherein
at least one of the second apparatus or the third apparatus is an apparatus that displays an alert image generated based on vehicle information obtained from a sensor provided in the vehicle.

12. The information processing apparatus according to claim 1, wherein
the hypervisor detects an occurrence of a failure relevant to any of the first OS, the second OS, or the third OS.

13. The information processing apparatus according to claim 12, wherein
upon detection of the occurrence of the failure, the hypervisor performs, on an OS in which the failure occurs, a process for restoring the OS.

14. The information processing apparatus according to claim 1, further comprising:
a fourth OS that controls execution of a fourth application for detecting an occurrence of a failure relevant to any of the first OS, the second OS, or the third OS.

15. The information processing apparatus according to claim 14, wherein
upon detection of the occurrence of the failure, the fourth application performs, on an OS in which the failure occurs, a process for restoring the OS.

16. The information processing apparatus according to claim 1, wherein
each of the first OS and the second OS detects a failure relevant to another OS.

17. The information processing apparatus according to claim 16, wherein
upon detection of an occurrence of the failure relevant to the other OS, each of the first OS and the second OS performs, on the other OS, a process for restoring the other OS in which the failure has occurred.

18. An information processing system, comprising:
a first Operating System (OS) that controls execution of a first application governing an operation of a first apparatus mounted in a vehicle;
a second OS that controls execution of a second application governing an operation of a second apparatus that is mounted in the vehicle and that has a safety requirement level higher than a safety requirement level of the first apparatus;
a third OS that controls execution of a third application governing an operation of a third apparatus that is mounted in the vehicle;
a hypervisor that is executed on a processor and controls execution of the first OS, the second OS, and the third OS;

the first apparatus;

the second apparatus; and the third apparatus, wherein the first apparatus is a line-of-sight detection apparatus for detecting a direction in which a line of sight of an occupant of the vehicle is directed, the second apparatus and the third apparatus are each a display apparatus specified based on the direction of the line of sight detected by the line-of-sight detection apparatus, the second apparatus is a center display, and the third apparatus is a head-up display.

19. An information processing method, comprising:

controlling, by a first Operating System (OS), execution of a first application governing an operation of a first apparatus mounted in a vehicle;

controlling, by a second OS, execution of a second application governing an operation of a second apparatus that is mounted in the vehicle and has a safety requirement level higher than a safety requirement level of the first apparatus;

controlling, by a third OS, execution of a third application governing an operation of a third apparatus that is mounted in the vehicle; and controlling, by a hypervisor executed on a processor, execution of the first OS, the second OS, and the third OS, wherein the first apparatus is a line-of-sight detection apparatus for detecting a direction in which a line of sight of an occupant of the vehicle is directed, the second apparatus and the third apparatus are a display apparatus specified based on the direction of the line of sight detected by the line-of-sight detection apparatus, the second apparatus is a center display, and the third apparatus is a head-up display.

* * * * *